(12) United States Patent
Fragala et al.

(10) Patent No.: US 8,387,529 B2
(45) Date of Patent: *Mar. 5, 2013

(54) STAMPS WITH MICROMETER-AND NANOMETER-SCALE FEATURES AND METHODS OF FABRICATION THEREOF

(75) Inventors: Joseph S. Fragala, San Jose, CA (US); Cedric Loiret-Bernal, Evanston, IL (US); Hua Zhang, Evanston, IL (US); Raymond Roger Shile, Los Gatos, CA (US); Bjoern Rosner, Chicago, IL (US); Sylvain Cruchon-Dupeyrat, Chicago, IL (US)

(73) Assignee: NanoInk, Inc., Skokie, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/286,954

(22) Filed: Nov. 1, 2011

(65) Prior Publication Data

US 2012/0052415 A1 Mar. 1, 2012

Related U.S. Application Data

(62) Division of application No. 11/305,326, filed on Dec. 19, 2005, now Pat. No. 8,069,782.

(60) Provisional application No. 60/637,063, filed on Dec. 20, 2004.

(51) Int. Cl.
*B41C 1/00* (2006.01)
(52) U.S. Cl. ...................................... 101/401.1; 101/28
(58) Field of Classification Search ........................ None
See application file for complete search history.

(56) References Cited

U.S. PATENT DOCUMENTS

| | | | | |
|---|---|---|---|---|
| 8,069,782 B2* | 12/2011 | Fragala et al. | ................... | 101/28 |
| 8,235,302 B2* | 8/2012 | Loiret-Bernal et al. | ...... | 235/494 |
| 2006/0035164 A1* | 2/2006 | Schaper | ........................ | 430/200 |
| 2006/0196945 A1* | 9/2006 | Mendels | ........................ | 235/470 |

* cited by examiner

*Primary Examiner* — Joshua D Zimmerman
(74) *Attorney, Agent, or Firm* — Foley & Lardner LLP

(57) ABSTRACT

Stamps and methods of making stamps for applications in anti-counterfeiting and authentication. The stamps are relatively small in size and feature nanoscale and microscale identification regions and features. High throughput manufacturing and high resolution methods are used to make the stamps including electron beam lithography and optical lithography. Anti-fouling coatings can be applied.

20 Claims, 20 Drawing Sheets

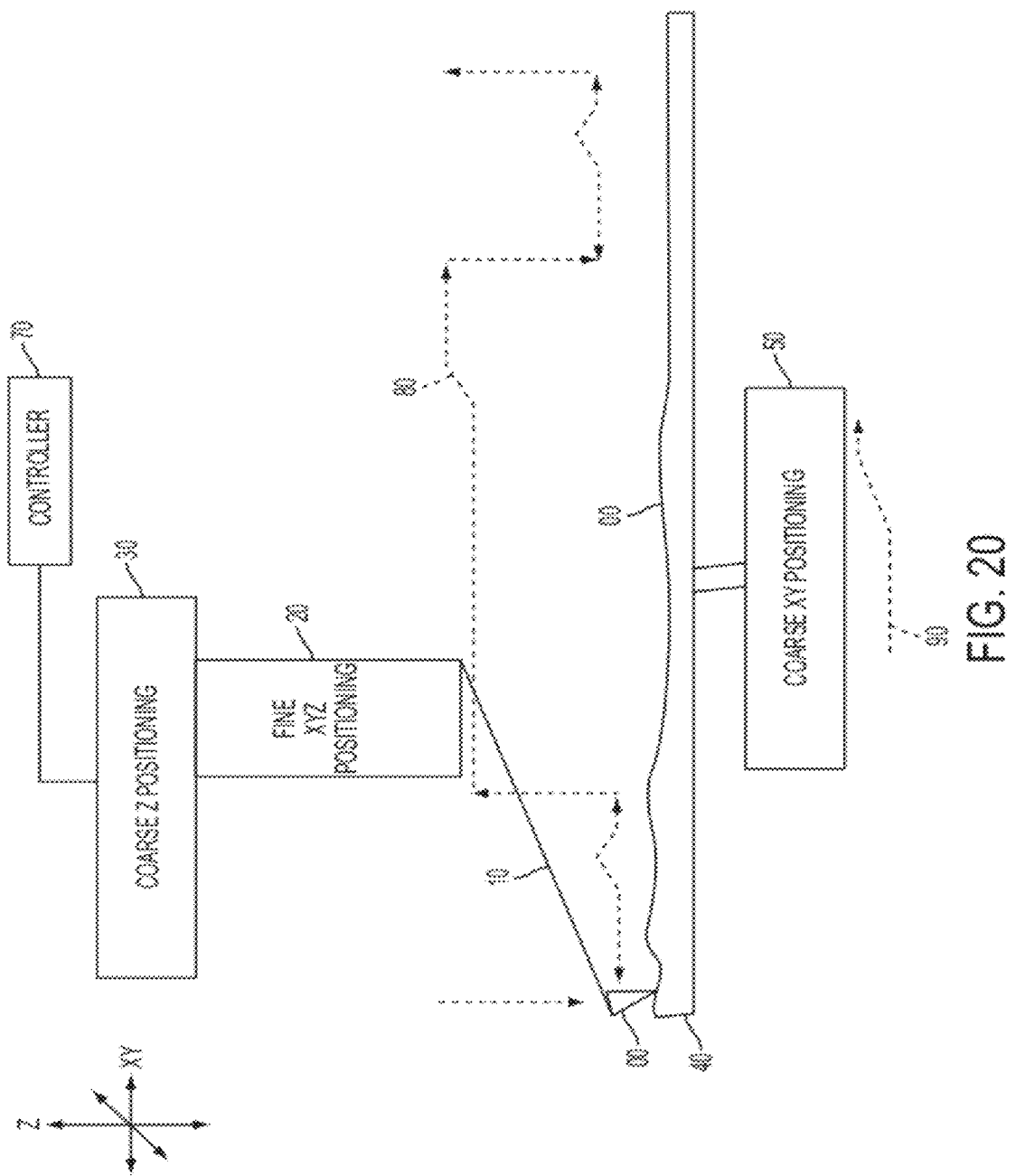

STAMPS WITH MICROMETER-AND NANOMETER-SCALE FEATURES AND METHODS OF FABRICATION THEREOF

RELATED APPLICATIONS

This application is a divisional of U.S. patent application Ser. No. 11/305,326, filed Dec. 19, 2005, which is hereby incorporated by reference in its entirety, and which claims priority to provisional application Ser. No. 60/637,063 filed Dec. 20, 2004 to Cruchon-Dupeyrat et al which is hereby incorporated by reference in its entirety.

BACKGROUND

A need exists to provide for better protection and security against counterfeiting and grey-market trading, particularly for pharmaceuticals. A review of counterfeiting in pharmaceuticals and its economic effects may be found in, for example, (1) "Counterfeit Pharmaceuticals: Current Status and Future Projections," A. I. Wertheimer, N. M. Chaney, T. Santella, J. Am. Pharm. Assoc. 43(6):710-718, 2003, and (2) Chapter 4 of the book "*Counterfeiting exposed: protecting your brand and your customers*," D. M. Hopkins, L. T. Kontnik, M. T. Turnage (Wiley, Ed. 2003); ISBN: 0471269905. Chapter 12 describes current anti-counterfeiting methods, such as holograms, intaglio printing, color-shifting technologies, and chemical or biochemical taggants. In many cases, however, most of these prior methods are not appropriate for pharmaceuticals, since they would require the addition of a non-edible or unapproved chemical compound to the tablet or capsule. There is therefore a need for an improved anti-counterfeiting method that does not significantly modify the target pharmaceutical unit.

SUMMARY OF THE INVENTION

Exemplary embodiments of the present invention are summarized in this non-limiting summary section.

In a promising method, micro- or nanostructured stamps having microscale or nanoscale identification regions are embossed into pharmaceutical compositions to produce microscale or nanoscale marks. Hence, there is a need for methods to fabricate micro- or nanostructured stamps. In addition, there is also a need to replicate said stamps to obtain large quantities thereof for use in high-throughput, parallel embossing production machines.

The invention generally relates to the methods and apparatus for the fabrication of micro- or nanostructured stamps. These stamps are useful in, for example, the embossing of micro- to nanoscale features onto objects and compositions, such as pharmaceutical compositions, especially for identification and anti-counterfeiting purposes.

In particular, provided is a method of preparing a stamp for imprinting at least one pharmaceutical composition comprising:
 (a) coating a stamp substrate with a resist;
 (b) forming a latent image by electron-beam or optical lithography;
 (c) developing the resist to form a resist pattern;
 (d) etching the substrate and/or depositing material onto the surface;
 (e) removing the resist to form a patterned substrate comprising surface topography with micron-scale or nanometer-scale lateral dimensions, wherein the size of the stamp is one mm square or less. The stamp can be produced by singulating the substrate into stamps.

Another embodiment is a method for fabricating stamps for stamping pharmaceutical compositions with identification features at a desired resolution and throughput comprising:
 fabricating stamps, wherein the stamps comprise a surface having at least one identification region, wherein the identification region has an enclosing perimeter around the identification features so that all of the identification features can be found within the enclosing perimeter, and the perimeter provides an identification region area which is about 10,000 microns or less,
 wherein the fabricating method provides at least 20 stamps per run at a resolution of two microns or less.

Another embodiment is a stamp for imprinting at least one pharmaceutical composition comprising a stamp surface, wherein the surface comprises at least one identification region having at least one identification feature, the feature having at least one lateral dimension of 100 microns or less, and wherein the size of the stamp is one mm square or less.

For purposes of this application, the inventive features do not reside in the instrument for using the stamp.

BRIEF DESCRIPTION OF THE DRAWINGS

FIG. 20 illustrates step-and-repeat scanning probe lithography.

DETAILED DESCRIPTION OF THE PREFERRED EMBODIMENTS

Figure 1:
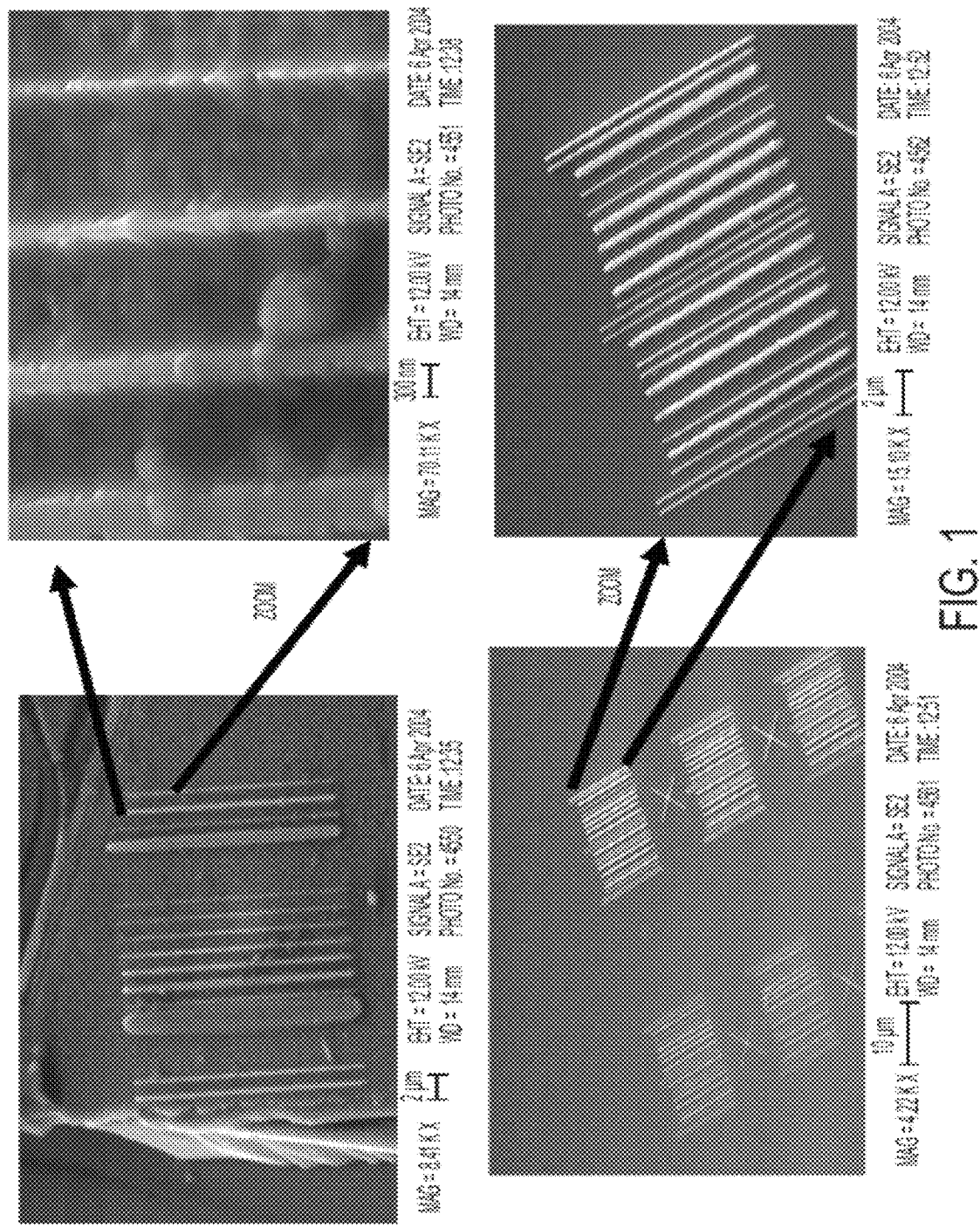
FIG. 1 shows SEM scans of a silicon master stamp.

The references cited in this and other sections can be referred to in the practice of the present invention and are hereby incorporated by reference. No admission is made that any of the cited references is prior art.

In the following, the terms "mold" and "stamp" are regarded as essentially equivalent. The former will be used to emphasize (but not limit to) its role as a template for a subsequent deposition or forming step, while the latter indicates the intent to press said stamp against a surface in hope of deforming said surface.

A nanostructured stamp is a substrate having a primary surface, said primary surface comprising at least one nanostructured region, said nanostructured region comprising at least one nanostructure. Said nanostructures include but are not limited to recesses or protrusions, such as these created by the local removal or addition of matter from said stamp surface.

A microstructured stamp is understood to bear microstructured region(s) comprising microstructures. The present invention encompasses microstructured stamps that are also nanostructured, including these which microstructures incorporate nanostructures.

A "secondary stamp" (also called "daughter stamp") derives, directly or indirectly, from a "primary stamp" (also called "master stamp"). Typical methods to derive a secondary stamp from a primary stamp include but are not limited to molding, forming, or imprinting. The phrase "primary stamp" typically describes the first physical embodiment of a design (which itself means information stored, for example, on a computer-readable medium). One may conceive of multiple successive generations of daughter stamps. A second-generation stamp may be called a "grand-daughter stamp".

The terms "duplication" and "replication" are usually used to describe the process of fabricating a secondary stamp from a primary stamp.

The nouns "master", "primary", "secondary" "daughter" may be used as shorthand for "master stamp", "primary stamp", "secondary stamp", "daughter stamp".

An "insert" is a contraption (usually a mechanically robust metallic part) suitable as a carrier for a nanostructured stamp and as a mechanical and thermal interface to a machine, such as a high-throughput embossing apparatus.

"Covert" means difficult to detect, locate or decode, especially with the naked eye or with conventional inspection technology, such as optical imaging.

The present invention enables one to detect counterfeiting, grey-market trading and other fraud by preparing covert microscale and nanoscale identification regions on objects and compositions, including pharmaceuticals. Preferably, said microscale and nanoscale identification regions are prepared by embossing with a micro- or nanostructured stamp. The present invention discloses methods and apparatus to produce stamps, including methods to fabricate master stamp, methods to duplicate stamps, methods to combine microscale and nanoscale patterns onto stamps, methods for the deposition of an anti-fouling layer on said stamp, methods of fabrication of an insert to support the stamp, and automated nanolithography instruments for the production of said stamps. Further, it relates to methods of preparing a micro- or nanostructured stamp or mold using nanolithography combined with etching, deposition, electroforming and/or polymer imprinting. It relates more particularly to scanning probe lithography (SPL) methods, such as Dip Pen Nanolithography™ printing (also called DPN™ printing; Dip Pen Nanolithography and DPN are trademarks of NanoInk, inc.) combined with etching, electroplating, electroforming, electroless deposition, chemical or physical vapor deposition and other pattern transfer techniques. Working examples are provided.

Part I: The Stamp

The pharmaceutical compositions, as well as other objects and compositions, can be made with one or more stamps which provide the surface with the identification feature. The invention provides a stamp for use in making a pharmaceutical composition, or other objects and compositions, the stamp comprising a surface having at least one identification region, and the region having at least one identification feature. In general, the stamps can be master stamps and can be used repeatedly, or can be used to produce other stamps.

Because the stamp can have a shape which is transferred to the pharmaceutical composition, or other objects and compositions, the dimensions described herein for the identification features and identification regions can also be used to describe the stamp. For example, a stamp which has an identification feature having a 100 nm height can result in a pharmaceutical composition, or other composition or object, having an identification feature with 100 nm height. The stamp's 100 nm positive protrusion can produce a 100 nm negative inversion.

In particular, the identification regions and features on the stamp can be characterized by dimensional measurements such as lateral dimensions or vertical dimensions with respect to the surface. Conventional methods can be used to measure these dimensions including methods described herein and the working examples. Conventional data processing (including image processing, pattern recognition, curve fitting and optical character recognition, OCR) can be carried out to provide dimensions and average dimensions and generally to provide useful data.

The identification regions of the stamp can each have one or more identification features which can be characterized by a lateral dimension with respect to the surface. The lateral dimension can be, for example, a width or a length such as, for example, a circle diameter or a line width, or the relative or absolute position compared to a known mark. The lateral dimension is different from a vertical dimension such as height. For an identification feature which is a line, the lateral dimension of length can be sufficiently long that it can be viewed with the naked eye or an optical microscope, whereas the lateral dimension which is width can be sufficiently small that it cannot be seen with a naked eye or optical microscope. The size of the lateral dimensions can be sufficiently small so that the identification features are invisible to the naked eye and difficult to detect by conventional, simple methods. Rather, difficult, relatively expensive methods can be used to detect small identification features including microscopic and nanoscopic features. At least one of the lateral dimensions can be made small. For example, the identification feature of the stamp can have a lateral dimension of, for example, about 500 microns or less, or about 400 microns or less, or about 300 microns or less, or more particularly, about 250 microns or less, or more particularly, about 100 microns or less, or more particularly, about 10 microns or less. Or the identification feature can have a lateral dimension of, for example, about one micron or less, or more particularly, about 500 nm or less, or more particularly, about 250 nm or less, or more particularly, about 100 nm or less. There is no particular limit to how small the lateral dimension can be as long as the identification feature can be detected. For example, the lateral dimension can be at least about 1 nm, or more particularly, at least about 10 nm, or more particularly, at least about 100 nm, or more particularly at least about one micron. Hence, exemplary ranges for the lateral dimension include, for example, about one nm to about 500 microns, about 10 nm to about 100 nm, about 100 nm to about one micron, and about one micron to about 500 microns.

For barcodes on the stamp, the line length is not particularly limited but can vary from nanoscopic to microscopic. For example, lines can be about one micron to about 50 microns long, or about 5 microns to about 25 microns long, and yet have a line width of only about 50 nm to about 150 nm wide.

The identification features on the stamp can be in the form of a pattern of repeating features such as dots or lines, wherein the features are characterized by an average lateral dimension such as average circle diameter or line width. The lateral size dimensions described herein can be computed into average lateral dimensions.

The identification features on the stamp can have a vertical dimension such as a height dimension or a depth dimension, and these terms are used interchangeably and for both positive structures and negative structures. The height dimension is not particularly limited and can be, for example, about one micron or less, or more particularly, about 500 nm or less, or more particularly about 250 nm or less, or more particularly about 150 nm or less. There is no particular lower limit to the height dimension as long as the identification feature can be detected. The height dimension can be, for example, about one nm or more, or about 10 nm or more, or about 25 nm or more. Exemplary ranges can be, for example, about one nm to about one micron, or about 10 nm to about 500 nm, or about 25 nm to about 250 nm. Again, if a pattern of repeating identification features are used, the vertical dimension can represent an average dimension.

In addition to the lateral dimension and the height dimension for identification features on the stamp, the invention can be also characterized by a separation dimension which represents the distance between the identification features such as a separation distance or a pitch. In other words, the one or more identification features can be separated from each other by a particular distance, and this distance can be an average distance for an array of identification features. For example, if the identification features are a series of lines, a distance can be measured between the centers of the lines, or if the identification features are a series of dots, a distance can be measured between the centers of the dots. The distance of separation is not particularly limited but smaller separation distances are preferred so that the identification is invisible to the unaided eye. For example, the one or more identification features can be separated from each other by an average distance of about 500 microns or less, or more particularly, about 100 microns or less, or more particularly, about 10 microns or less, or more particularly, about one micron or less, or more particularly, about 500 nm or less.

The stamp can also be characterized by the density of the identification features. For example, a plurality of parallel lines can be generated wherein there is at least one line per every two microns, or at least one line per every one micron, or at least one line per every 0.5 microns. See, for example, FIG. 1, wherein a height profile scan be used to determine a density.

The information associated with the identification region and features may be obtained by determining one or more of the aforementioned characteristics and optionally a mathematical function or algorithm.

The surface of the stamp also can comprise one or more marks which can be detected by an optical microscope or an unaided eye. The at least one mark can be located outside of the identification region. Examples include an X shaped mark. The marks, for example, can have lateral dimensions such as line width at the micron scale such as 10 microns or more, at least 50 microns or more, at least 100 microns or more.

The stamp can also comprise the identification regions described above for the pharmaceutical composition. The identification region can be characterized by an identification region area which has an enclosing perimeter around the identification features so that all of the identification features can be found within the enclosing perimeter. This area can be for example, about 10,000 square microns or less, or about 1,000 square microns or less, or about 400 square microns or less, or about 4 square microns or less, or about one square micron or less. The identification region can be, for example a square region with a lateral length and width of 100 microns×100 microns, respectively, or 20 microns×20 microns, or 2 microns×2 microns. Or the identification region can be, for example, a generally rectangular region or circular region. In many cases, two or more identification regions are desired in case one or more of the identification regions become unreadable by scratching, rubbing, or some other undesirable event. For example, the surface of the stamp can comprise more than 20, more than 30, more than 40, or more than 50 identification regions. The identification region can be sufficiently large to be seen by the naked eye or an optical microscope, even when identification features within the identification region can be sufficiently small that they cannot be seen by the naked eye or even with an optical microscope.

The material of the stamp is not particularly limited. In general, the stamp can have a surface which is made of a harder or stiffer material than the material of the surface to be stamped. Materials that can provide high aspect ratio structures can be used. For example, materials can be used which can be subjected to etching processes which result in high aspect ratios such as, for example, reactive ion etching. Stamp material can be, for example, silicon, silicon oxide, quartz, and nickel, and other substrates popular for semiconductor processing.

Stamps can be also treated to increase the durability of the stamp. For example, stamp surfaces can be coated with diamond like coatings (DLC), or nickel films to increase hardness and decrease wear. Stamps fabricated from silicon substrates can be oxidized to increase the hardness of the stamp surface.

A master stamp can be used to produce daughter stamps which are substantially identical but inverted copies of the master.

In another embodiment, indirect nanolithography can be used to selectively remove or modify areas in a resist film coating a substrate. The patterned substrate can be subjected to etching to generate negative relief features, such as trenches, in the substrate. Stamps with negative relief features will result in positive features when used for printing. Negative relief stamps can be replicated to generate secondary stamps that have positive features.

Figure 2:
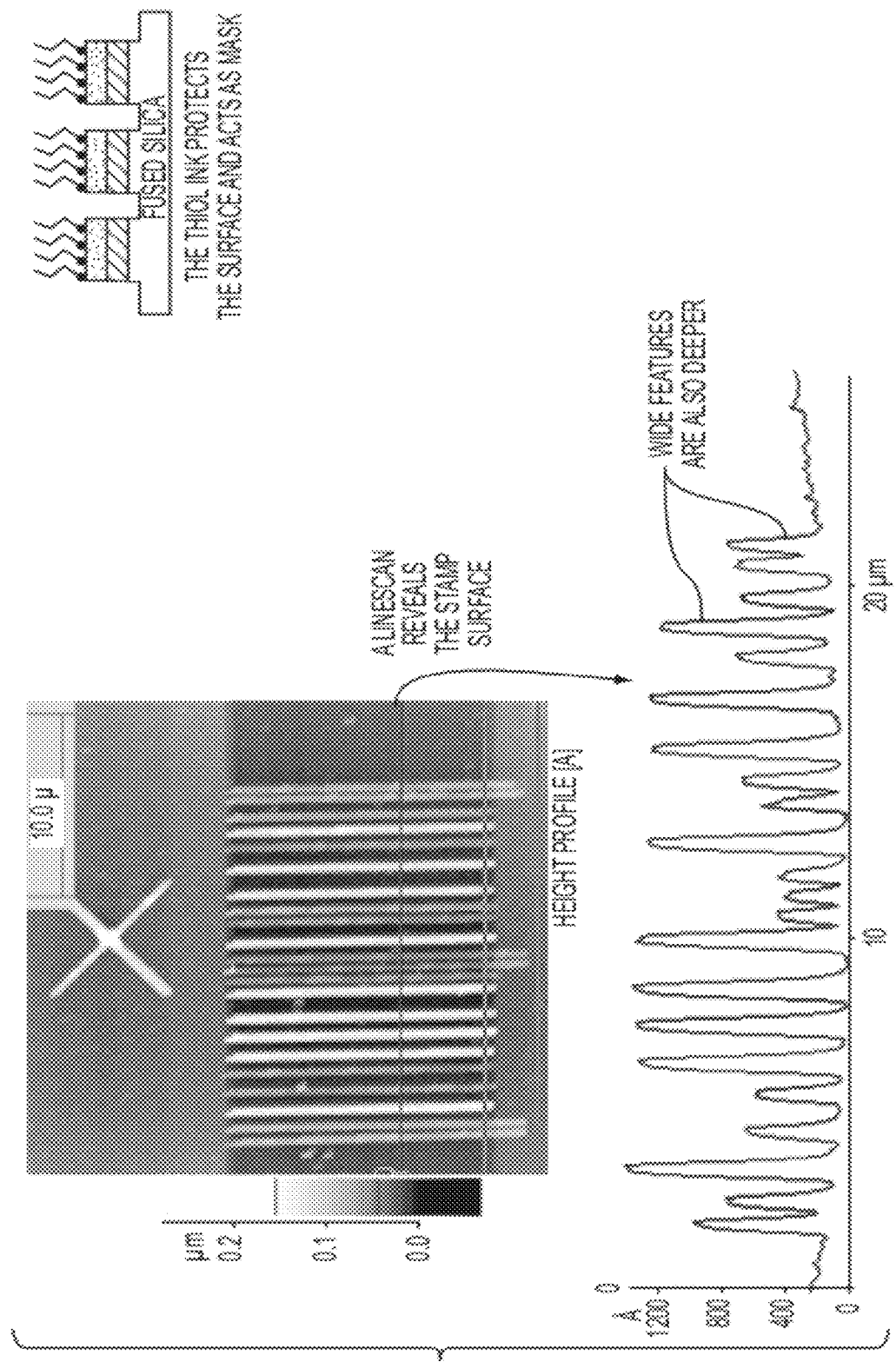
FIG. 2 shows AFM scan of a silicon master stamp with a height line scan.

FIG. 2 is a working example described further below. It provides an AFM scan of a stamp which has an identification region and identification features which can be transferred to the object, composition, and pharmaceutical composition. For example, it comprises at least six identification features. The positive features rising out of the surface have a generally triangular shape according to the height profile analysis. The scan shows six lines in approximately parallel arrangement. The center of the line can be used to measure a separation distance.

Figure 3:
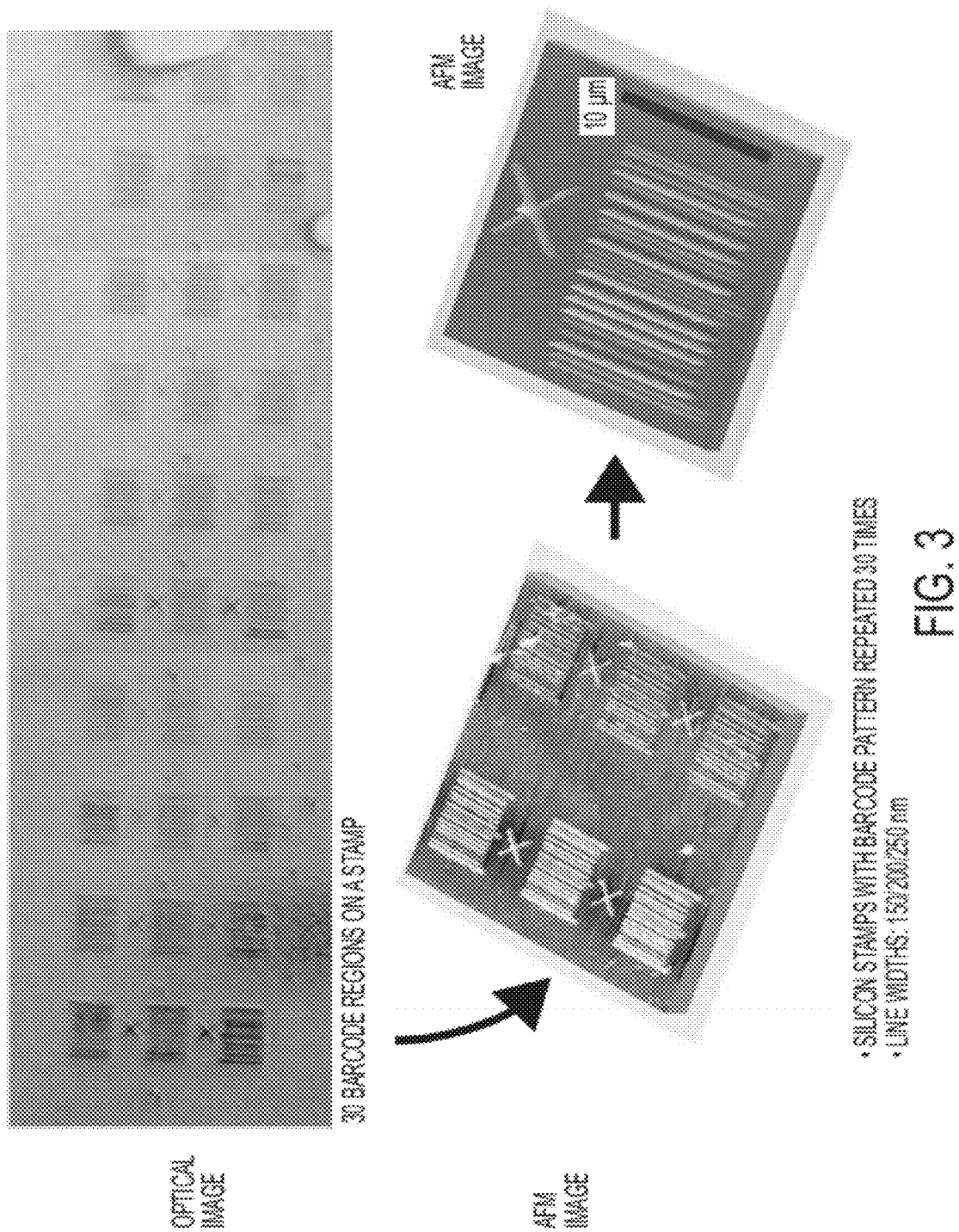
FIG. 3 shows optical micrographs and AFM scans of barcode regions in a silicon master stamp including pattern redundancy with multiple pens.
Figure 6:
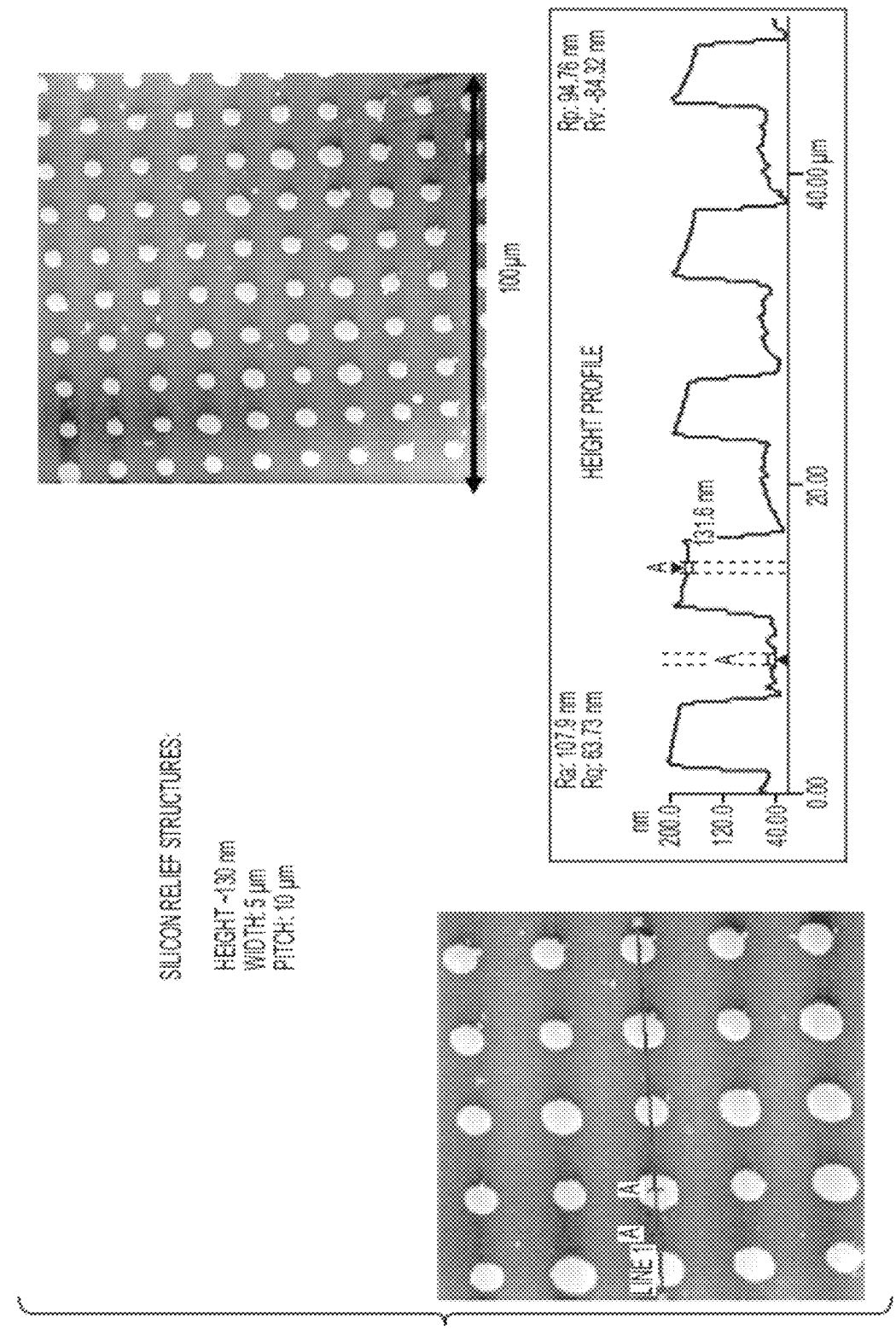
FIG. 6 shows AFM images of micropatterns on silicon stamp.
Figure 7:
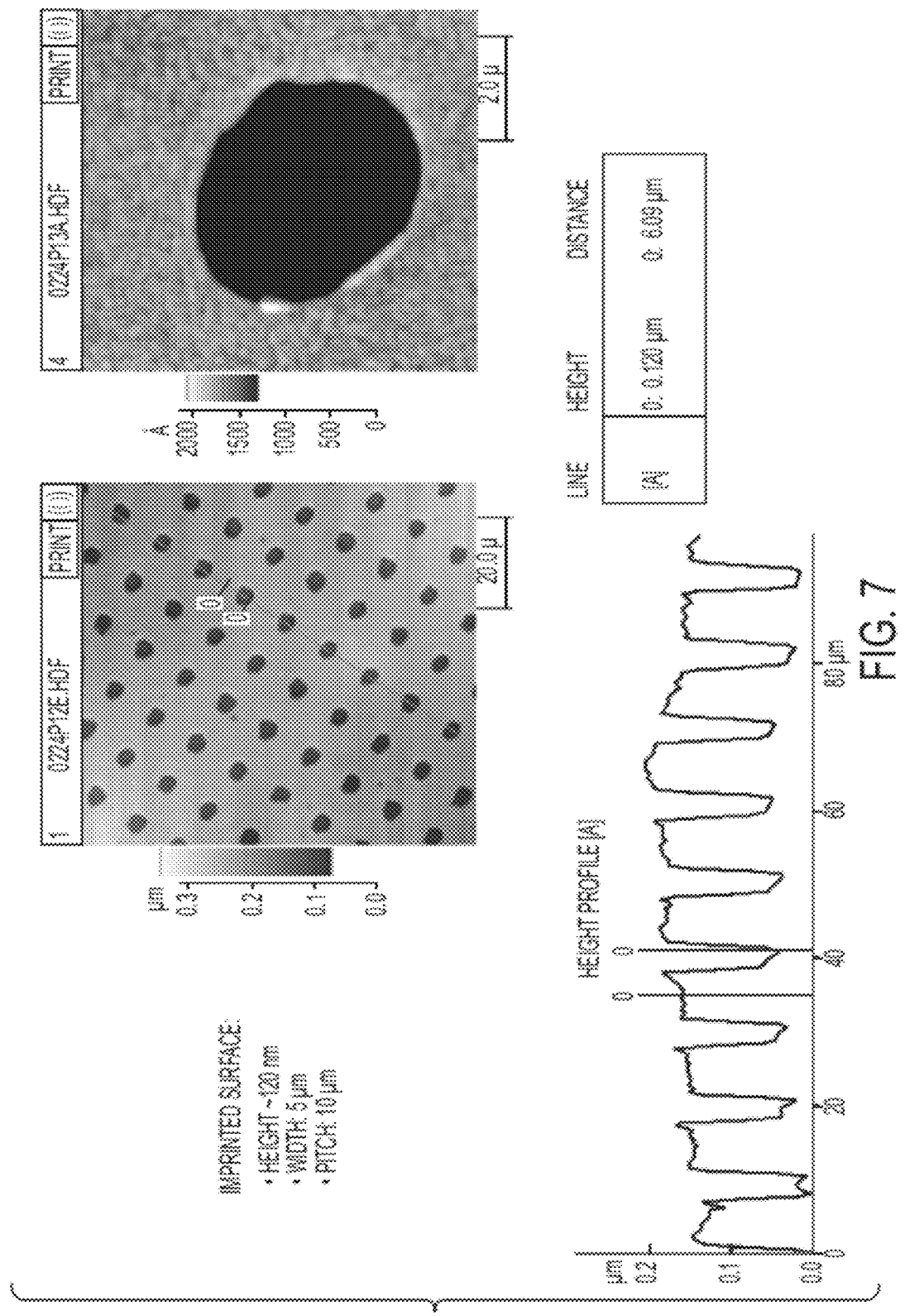
FIG. 7 shows AFM image of a micro-imprinted tablet film coating and height scans.
Figure 8:
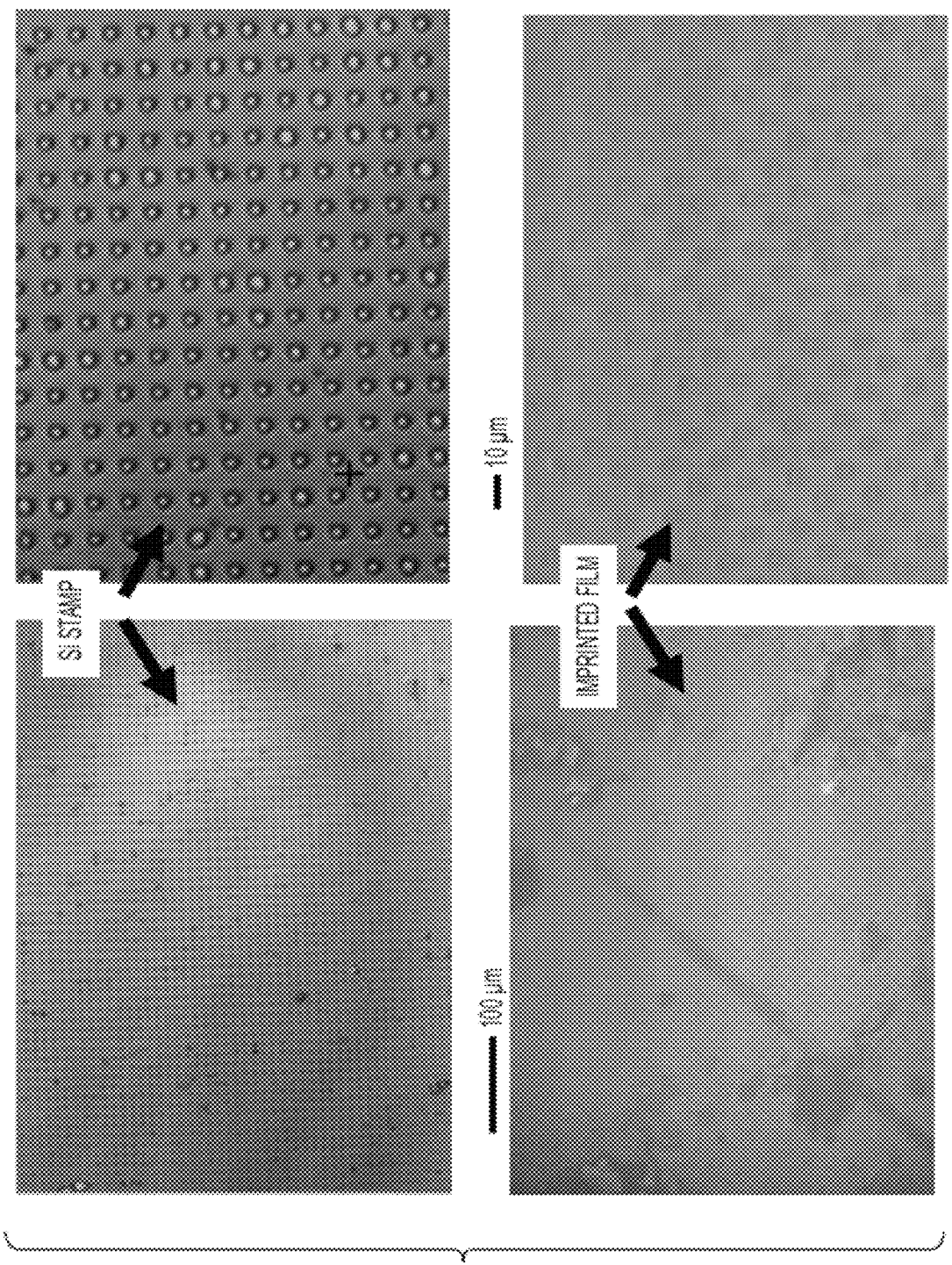
FIG. 8 shows optical images comparing the original micron-scale stamp with the imprinted surface of the tablet film coating.

FIG. 6 is another working example further described below. Here, a pattern of dots are used. The density of dots in the cross-sectional height profile is better than one dot per 10 microns. FIG. 1 is a working example and shows SEM scans of several stamps. FIG. 3 is a working example and shows a plurality of identification regions on one stamp. Each identification region comprises a series of identification features which are barcode lines.

In the nanolithography regime, nanoimprint lithography is a method which can be used in some cases to generate features having lateral dimensions below 200 nm using a stamp on polymer-coated semiconductor wafer. See, for example, U.S. Pat. Nos. 5,772,905 to Chou ("Nanoimprint Lithography"); 6,309,580 to Chou; 6,482,742 to Chou; and 6,518,189 to Chou. The method employs use of stamps having protruding features and made of stiff materials. These references can be used to practice the invention both with respect to the final stamp and the methods of making and using the stamp. Commercial products including stamping instruments and molds or masks are available from Nanonex Corp. (Princeton, N.J.), Suss Microtech AG (Munich, Germany); EV Group (Schareding, Austria); Molecular Imprints Inc (Austin, Tex.); and Obducat (Malmo, Sweden).

Generally, stamp materials which can be used in NIL can be used in this invention. If silicon materials are used, they can be oxidized to silicon dioxide to improve properties such as, for example, durability.

For purposes of this application, the inventive features do not reside in the instrument for using the stamp.

Part II: Method of Making the Stamp—General Considerations

A variety of methods can be used to make the stamp. These methods can be carried out with use of microlithography or nanolithography and can provide excellent high resolution identification features. For example, DPN printing, nanoimprint lithography, microcontact printing, electron beam lithography, ion beam lithography, laser-based lithography, optical lithography, scanning probe lithographies (like nanografting, nanooxidation and scanning tunneling methods) and the like can be used. One may choose the appropriate fabrication method depending on its type. Fabrication methods may be classified as, for example:

Direct-write methods, which accomplish both pattern and material transfer processes simultaneously. For example, laser micromachining, in which a high-intensity laser beam ablates the substrate, may be used to prepare coarse microstructures with a resolution in the order of 5 microns.

Indirect methods, which require at least two steps: a lithographic process that defines the desired pattern into an intermediate layer (a resist) and a back-end process, for example an etching and/or lift-off step, that transfers the pattern from the resist layer into or onto the substrate. Optical lithography and electron-beam lithographies belong to that category.

Figure 10:
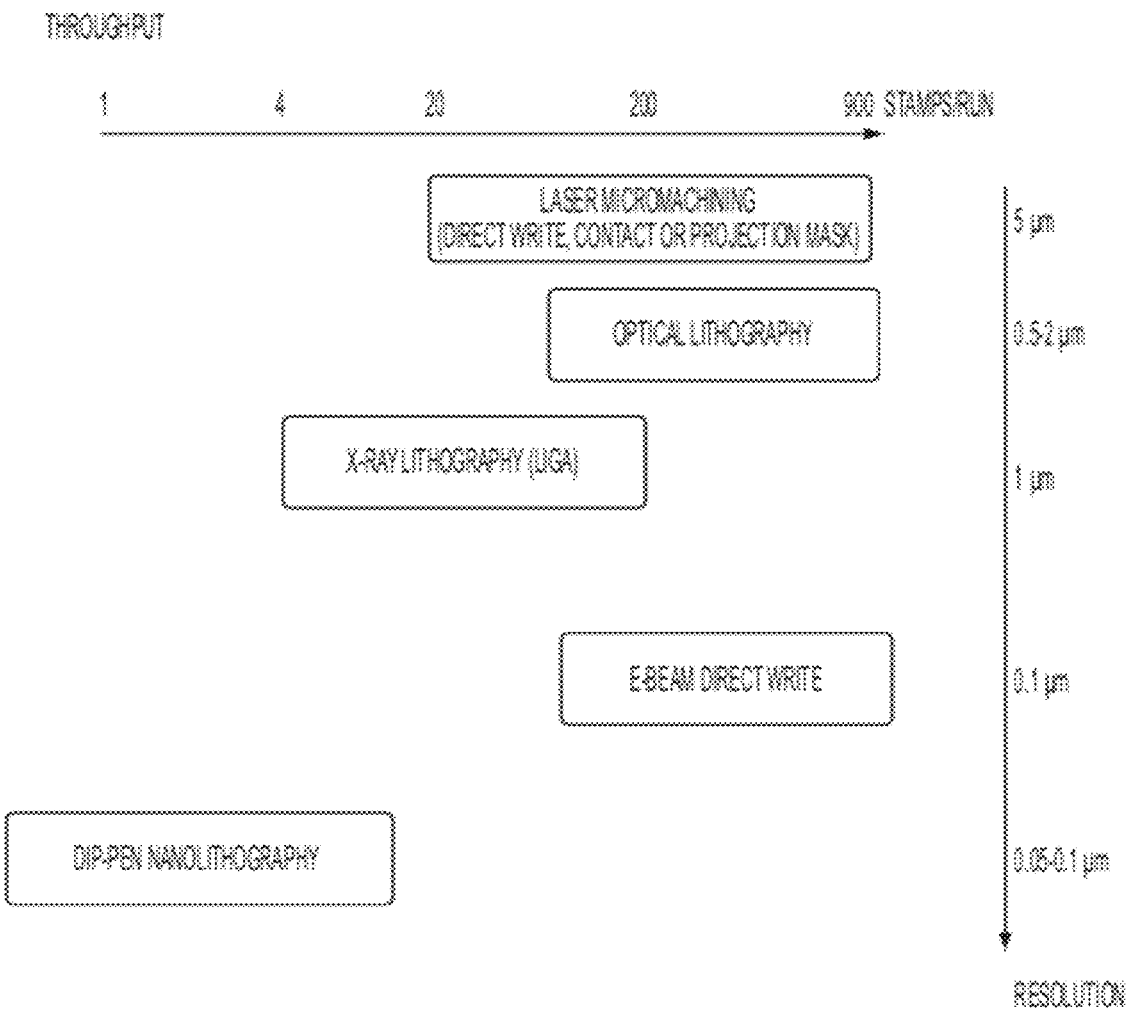
FIG. 10 compares the relative performance (resolution, throughput) of multiple lithographic techniques for the fabrication of nanostructured stamps.

One may also choose the appropriate fabrication technique as a function of the desired resolution and throughput (e.g., see FIG. 10).

For example, in one typical embodiment, the invention provides a method for making a stamp comprising the steps of (i) writing a pattern with a resist material by nanolithography or microlithography on a substrate, (ii) etching the patterned substrate, and optionally (iii) further treating the patterned and etched substrate to form the stamp. For example treatment step (iii) can comprise removing the resist, or any other layers which are undesired in the final stamp.

In another embodiment, direct write nanolithography can be used to pattern a monolayer resist on a substrate. The patterned substrate can be subjected to etching including wet etching or dry etching to remove areas unprotected by the resist. Finally, the resist itself can be removed. The resist can be, for example, a compound which covalently bonds or chemisorbs to the substrate. The resist can be, for example, an alkanethiol on a gold substrate. The substrate can be, for example, fused silica having an outer layer of metal with an intermediate adhesion layer as needed. The direct write nanolithographic method can be carried out with use of a nanoscopic tip to transfer resist material to the substrate by deposition.

Figure 4:
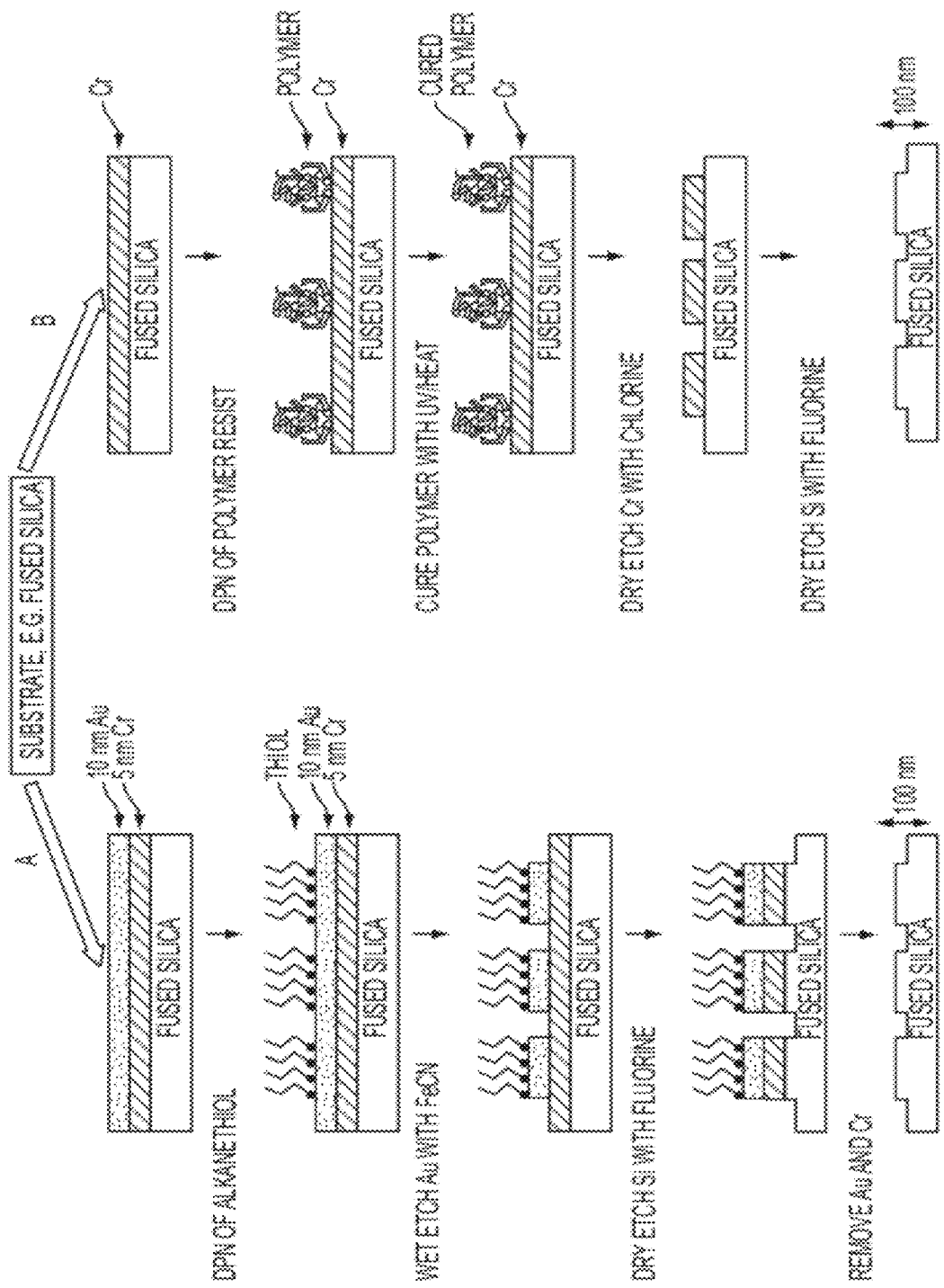
FIG. 4 shows a general fabrication process for patterning and etching to generate a high resolution stamp.

In another embodiment, illustrated in FIG. 4, direct write nanolithography can be used to pattern a resist on a substrate. The resist can be a curable material such as, for example, a UV curable or heat curable polymer. Etching can be carried out and the resist removed.

Figure 5:
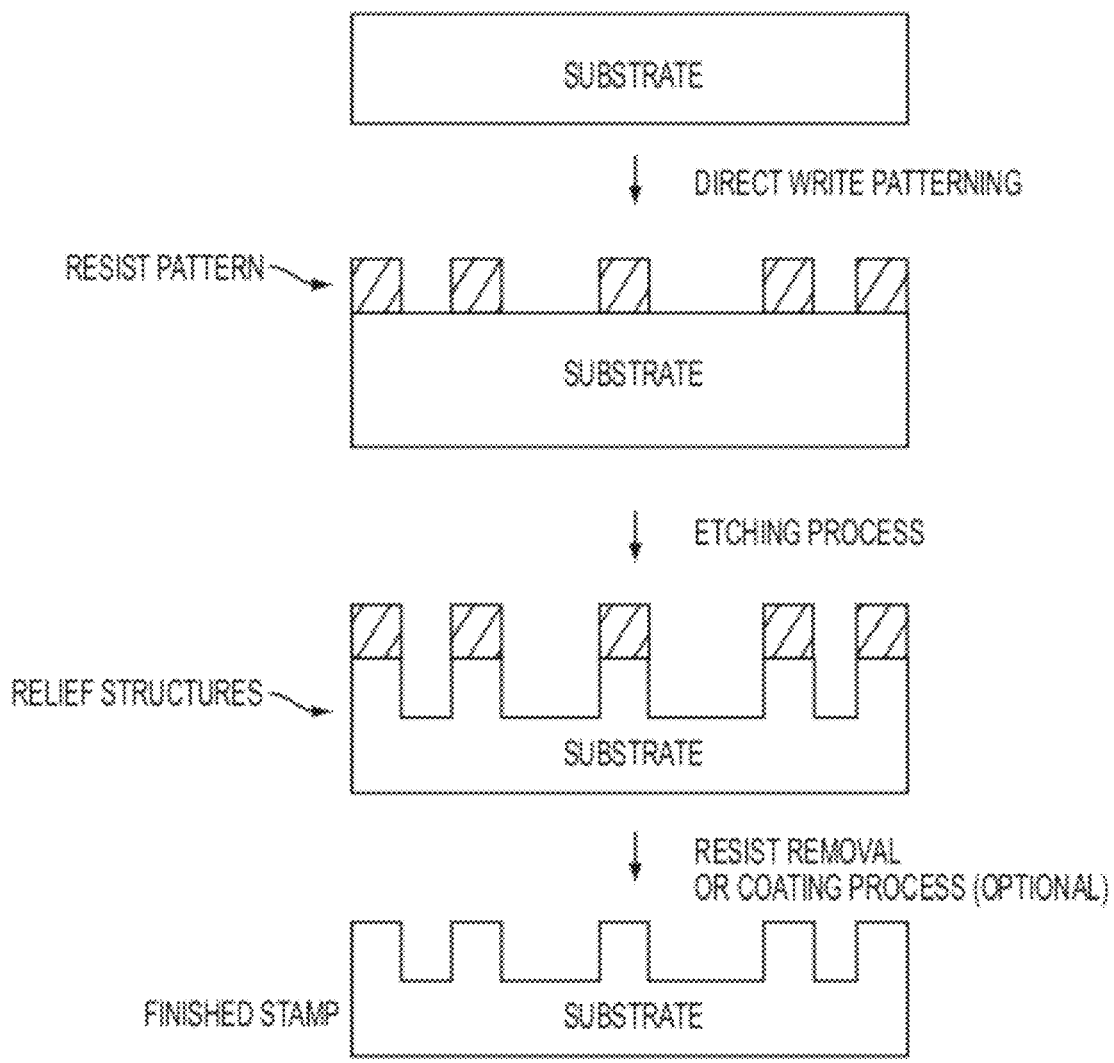
FIG. 5 shows two fabrication processes for high resolution which use DPN printing and etching.

FIGS. 5A and 5B further illustrate embodiments for stamp fabrication. Two process pathways are illustrated which each begin with a fused silica substrate and end with a fused silica stamp. These processes can be used also to make stamps in silicon substrates.

In the left pathway (FIG. 5A), a thermally oxidized silicon or fused silica substrate is provided which comprises further a gold surface layer and an interfacial adhesion layer of chromium. DPN printing can be carried out to produce a pattern of an alkanethiol on the gold surface. Wet etching can be carried out to etch away the gold layer not protected by the resist. Dry etching can be carried out to further remove chromium and silica. Finally, the resist, gold, and chromium can be further removed to yield the stamp.

In the right pathway (FIG. 5B); a fused silica substrate is provided which further comprises a chromium surface layer. DPN printing can be carried out to produce a pattern of a polymer resist on the chromium. The polymer can be cured by heat or light. After curing, dry etching by, for example, chlorine can be carried out to remove chromium. Finally, the resist, chromium, and silica can be removed to yield the stamp.

A stamp made by the methods disclosed above can be replicated into secondary stamps, as many identical stamps may be required for commercial production. Furthermore, the identification features present on the master stamp may be replicated multiple times on a secondary stamp, providing redundancy as discussed above. The master stamp may be replicated e.g. by stamping, molding into a soft material (or other methods known to the art), followed by a hardening or coating step, for example polymeric curing, vacuum physical vapor deposition, electroless plating, electroplating or a combination thereof.

In another embodiment, the stamp is replicated on a thin film or foil which is wrapped around a cylinder, then hardened or coated by a hard material. Alternatively, a cylinder may be rolled over the stamp, duplicating the stamp features on said cylinder. See the related art in Chou et al. JVST B 16(6), 1998. The cylinder is then used as a stamp by rolling it over the desired pharmaceutical composition or object. The processes are further described in the working examples.

Part III: Direct-Write Nanolithography and DPN Printing in Making the Stamp

In a preferred method, direct-write nanolithography is used in the process to prepare the stamp. A preferred method is the use of deposition of inks or patterning compounds from a fine, sharp needle like structure which can be, for example, a scanning probe cantilever with or without a tip. The needle like structure can have the patterning compound at the end and can be used to deposit the ink or patterning compound to a substrate. A preferred method of direct-write nanolithography is DPN printing. This method provides for exceptionally high resolution and good patterning capability.

For example, DPN printing technology and etching procedures are described in pending patent application to Mirkin et al. entitled "Fabrication of Solid-State Nanostructures including sub-50 nm Solid-State Nanostructures Based on Nanolithography and Chemical Etching" filed Dec. 3, 2003 (Ser. No. 10/725,939), which is hereby incorporated by reference in its entirety. This application also describes a series of geometric patterns which can be used for the identification features.

In addition, DPN™ printing and deposition methods are extensively described in the following patent applications and patent publications, which are hereby incorporated by reference in their entirety and support the disclosure for the present inventions, particularly with respect to the experimental parameters for carrying out the deposition:

1. U.S. Provisional application 60/115,133 filed Jan. 7, 1999 ("Dip Pen Nanolithography"). This describes applications of deposited monolayers as etch resists.
2. U.S. Provisional application 60/157,633 filed Oct. 4, 1999 ("Methods Utilizing Scanning Probe Microscope Tips and Products Therefor or Produced Thereby").
3. U.S. patent application Ser. No. 09/477,997 filed Jan. 5, 2000 ("Methods Utilizing Scanning Probe Microscope Tips and Products Therefor or Produced Thereby"), now U.S. Pat. No. 6,635,311 to Mirkin et al. issued Oct. 21, 2003. A wide variety of inks and substrates are described which show chemisorption between the ink and the substrate and can be used as an etch resist.
4. U.S. Provisional application 60/207,713 filed May 26, 2000 ("Methods Utilizing Scanning Probe Microscope Tips and Products Therefor or Produced Thereby"). This application, for example, describes wet chemical etching, working examples, references, and figures, which are all incorporated by reference in their entirety.
5. U.S. Provisional application 60/207,711 filed May 26, 2000 ("Methods Utilizing Scanning Probe Microscope Tips and Products Therefor or Produced Thereby").
6. U.S. patent application Ser. No. 09/866,533 filed May 24, 2001 ("Methods Utilizing Scanning Probe Microscope Tips and Products Therefor or Produced Thereby"). This application, for example, describes wet chemical etching, working examples (e.g., example 5), references, and figures, which are all incorporated by reference in their entirety. Computer control of the nanolithographic deposition is also described.
7. U.S. patent publication No. 2002/0063212 A1 published May 30, 2002 ("Methods Utilizing Scanning Probe Microscope Tips and Products Therefor or Produced Thereby").
8. U.S. patent publication No. 2002/0122873 A1 published Sep. 5, 2002 ("Nanolithography Methods and Products Produced Therefor and Produced Thereby").
9. PCT publication No. WO 00/41213 A1 published Jul. 13, 2000 based on PCT application no. PCT/US00/00319 filed Jan. 7, 2000 ("Methods Utilizing Scanning Probe Microscope Tips and Products Therefor or Produced Thereby").
10. PCT publication No. WO 01/91855 A1 published Dec. 6, 2001 based on PCT application No. PCT/US01/17067 filed May 25, 2001 ("Methods Utilizing Scanning Probe Microscope Tips and Products Therefor or Produced Thereby").
11. U.S. Provisional application 60/326,767 filed Oct. 2, 2001, ("Protein Arrays with Nanoscopic Features Generated by Dip-Pen Nanolithography"), now published 2003/0068446 on Apr. 10, 2003 to Mirkin et al.
12. U.S. Provisional application 60/337,598 filed Nov. 30, 2001, ("Patterning of Nucleic Acids by Dip-Pen Nanolithography") and U.S. patent application Ser. No. 10/307,515 filed. Dec. 2, 2002 to Mirkin et al.
13. U.S. Provisional application 60/341,614 filed Dec. 17, 2001, ("Patterning of Solid State Features by Dip-Pen Nanolithography"), now published 2003/0162004 Aug. 28, 2003 to Mirkin et al.
14. U.S. Provisional application 60/367,514 filed Mar. 27, 2002, and publication No. 2003/0185967 on Oct. 2, 2003 to Eby et al. This patent application describes computer control of nanolithographic procedures.
15. U.S. Provisional application 60/379,755 filed May 14, 2002, ("Nanolithographic Calibration Methods") and U.S. patent application Ser. No. 10/375,060 filed Feb. 28, 2003 to Cruchon-Dupeyrat et al. This patent application describes computer control of nanolithographic calibration procedures.
16. U.S. patent application Ser. No. 10/689,547 filed Oct. 21, 2003 to Crocker et al. ("Nanometer-Scale Engineered Structures, Methods, and Apparatus for Fabrication Thereof, and Application to Mask Repair, Enhancement and Fabrication"). This describes for example use of nanolithography to make photomasks and nanoimprint lithography stamps.
17. U.S. patent application Ser. No. 10/705,776 filed Nov. 12, 2003 to Cruchon-Dupeyrat ("Methods and Apparatus for Ink Delivery to Nanolithographic Probe Systems"). This describes, for example, use of reactive ion etching to make deep structures.
18. U.S. Provisional application 60/544,260 filed Feb. 13, 2004 ("Direct-Write Nanolithography with Stamp Tip: Fabrication and Applications"). This describes, for example, elastomer modification of tips.
19. U.S. Provisional application 60/547,091 filed Feb. 25, 2004 ("Methods for Patterning Conductive Material."). This describes, for example, use of tipless cantilevers.

In general, state of the art DPN™ printing and deposition-related products, including hardware, software, and instrumentation are also available from NanoInk, Inc. (Chicago, Ill.), and these can be used to carry out the present invention. For example, commercially available products include NSCRIPTOR, DPN-System-1, environmental chamber, probes, pens, inkwells, substrates, substrate holders, and various accessories including ink dispensing kits, ink dispersion syringes, replacement needles, and probe clips. NSCRIPTOR features for example InkCAD system control, closed loop scanning, and a series of computer programs to facilitate automation. Calibration can be carried out with InkCal. Probes can be single probes, passive multiple probe arrays, active probes, or probes for AC mode.

Parallel methods of the DPN printing process in active mode can be carried out as described in, for example, U.S. Pat. No. 6,642,129 to Liu et al. issued Nov. 4, 2003.

In addition, the following papers describes wet chemical etching procedures used in conjunction with direct-write nanolithography, and is hereby incorporated by reference in its entirety including figures, references, and working examples: Zhang et al., "Dip-Pen Nanolithography-Based Methodology for Preparing Arrays of Nanostructures Functionalized with Oligonucleotides"; *Adv. Mat.*, 2002, 14, No. 20, October 16, pages 1472-1474; Zhang et al., "Biofunctionalized Nanoarrays of Inorganic Structures Prepared by Dip-Pen Nanolithography"; *Nanotechnology*, 2003, 14, 1113-1117 (see further parts V and VI below).

Figure 9:
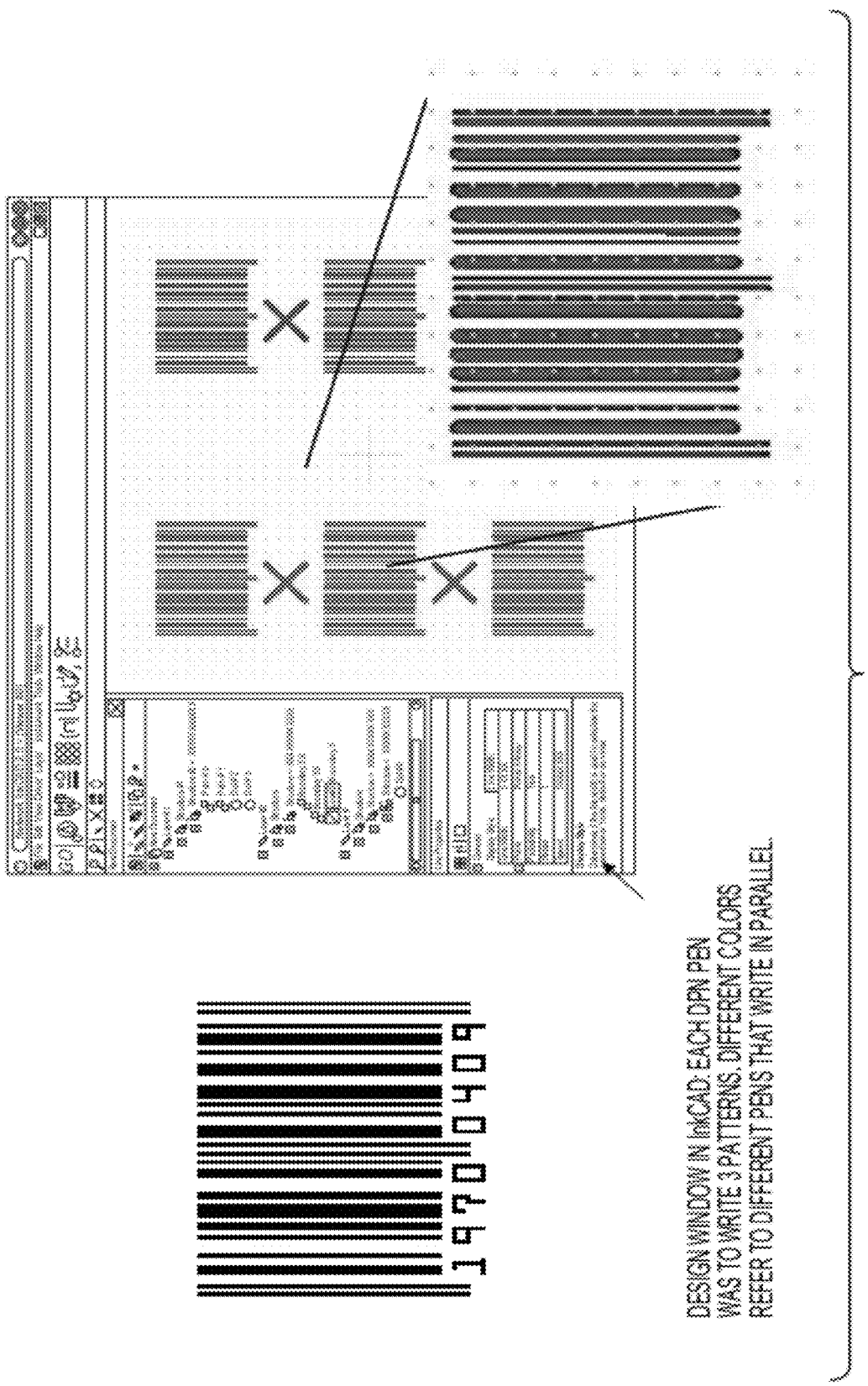
FIG. 9 shows how the NSCRIPTOR instrument is used for designing barcode patterns.

FIG. 9 illustrates use of NanoInk's NSCRIPTOR DPN-Writer in designing and writing patterns. Using computer generated images, which can be translated into physical patterns on surfaces, a wide variety of useful identification features and regions can be generated.

Part IV: Electron-Beam Direct Write Lithography

In another embodiment, the invention provides a method of preparation, using electron-beam direct-write nanolithography, of a nanostructured stamp useful for the imprinting of pharmaceutical compositions. The method comprises the following steps: (i) a focused electron beam is directed on a resist-coated substrate within the confines of electron-beam lithography equipment, forming a latent image in the resist; (ii) the resist is chemically developed, forming a resist pattern; (iii) the resist pattern may be used to protect the substrate during a subsequent processing step, including substrate etching or deposition and lift-off, forming a patterned substrate presenting topography with micron- to nanometer-scale lateral dimensions; (iv) the resulting mechanically resilient, nanostructured surface is used, directly or indirectly, as a template or stamp for the imprinting of at least one pharmaceutical composition.

E-beam direct-write lithography is adapted to lithography at very high resolution and is flexible, since it does not require a mask. Electron Beam lithography equipment may be purchased from Raith Gmbh (Dortmund, Germany), Leica Microsystems Inc. (Chantilly, Va.) or JEOL USA (Peabody, Mass.). E-beam lithography services are available from Rockwell Scientific (Thousand Oaks, Calif.). Resists adapted to electron-beam lithography are commercially available e.g. from Zeon Corp., Toray Corp. (both of Tokyo, Japan) and MicroChem (Newton, Mass.). Electron-beam lithography may be practiced with the help of the following literature, which are hereby incorporated by reference:
1) "Patterning of Material Layers in Submicron Region", U. S. Tandon, W. S. Khokle, Wiley, Ed.; 1994.
2) A. N. Broers, J. M. Harper, and W. W. Molzen, Appl. Phys. Lett. 33, 392 (1978)
3) P. B. Fischer and S. Y. Chou, Appl. Phys. Lett. 62, 2989 (1993)
4) Y. Chen, A. Pepin, Electrophoresis 22, 187-207 (2001).

In addition, it is known in the art that stamps used in nanoimprint lithography and related techniques are usually fabricated using e-beam lithography, see e.g., "Template for room temperature, low pressure micro- and nano-imprint lithography", U.S. Pat. No. 6,696,220 to Bailey et al. Electron-beam lithography techniques have been used to produce optically variable devices (OVD, a.k.a. "holograms") for use as anti-counterfeiting devices, see e.g., "Micro-technology for anti-counterfeiting", Microelectronic engineering 53(1-4):513-516 (2000) and references herein. Electron-beam lithography, followed with Nickel sputtering/electroplating and embossing using the resulting shim, has been used to form diffractive grating structures into the surface of silver coins, see, e.g., "Fabrication of hologram coins using electron beam lithography", P. W. Leech, B. A. Sexton, R. J. Marnock, F. Smith, Microelectronic Engineering 71(2):171-176 (2004). The present invention improves on these methods by providing an e-beam lithography-based method to fabricate covert anti-counterfeiting features useful for pharmaceutical composition protection.

The invention further provides (i) a stamp prepared by e-beam direct write lithography and used for the imprinting, embossing or other forms of marking of pharmaceutical compositions, esp. for the purpose of the tracking of said pharmaceutical compositions and/or to prevent counterfeiting. The invention also relates to (ii) a stamping apparatus comprising at least one stamping surface, said surface comprising at least one nanostructured pattern formed with the use of electron-beam direct-write lithography; and (iii) a pharmaceutical composition comprising at least one identification region, the identification region comprising at least one micrometer- to nanometer-scale pattern, said pattern a replicate of a template fabricated by electron-beam lithography.

Part V: Other Lithography Technologies

In yet another embodiment, the invention discloses the use of microfabrication techniques other than scanning probe lithography, electron-beam lithography and extreme UV lithography to prepare stamps to be used as embossing means for brand protection and product tracking, especially in the context of pharmaceutical composition marking. Lithographic methods under consideration include but are not limited to optical lithography (including immersion lithography, Deep Ultraviolet (DUV) lithography and Vacuum Ultraviolet (VUV) lithography), focused ion beam lithography (FIB), X-ray lithography, electron and ion projection lithography (EPL and IPL), including SCAPEL and PREVAIL, low energy electron proximity projection lithography (LEEPL), forms of lithography involving neutral atoms, and grey-tone (relief) microlithography.

The lithography step may be optionally combined with (i) one or more process steps including in a non-limiting way wet or dry etching, lift-off, substrate doping (including ion implementation), layer deposition, electroplating, electroless plating, (ii) zero or more planarization steps, including polishing, chemical mechanical polishing and overcoating with a thick layer. This includes processes such as Lithographie-Galvanoformung-Abformung (LIGA) and its optical lithography equivalent (UV-LIGA), see, e.g., "Microprocessing at the fingertips", G. Thornell, S. Johnansson, *J. Micromech. Microeng.* 8, 251-262 (1998).

The invention also relates to a method of manufacturing, using soft lithography, of a stamp for embossing at least one pharmaceutical composition, the method comprising the steps of (i) providing a preexisting template comprising at least a micro- or nanostructured identification region; (ii) producing a secondary stamp with the use of the template using at least one step of soft lithography (including but not limited to microcontact printing, replication molding, micromolding in capillaries), nanoimprint lithography and step-and-flash lithography.

The following references may be used to practice the invention and are hereby incorporated by reference:
1) Lithographic imaging techniques, including optical lithography, particle beam lithography, EUV and X-ray have been reviewed by Wallraff and Hinsberg, "Lithographic Imaging Techniques for the formation of nanoscopic features", G. M. Walraff, W. D. Hinsberg *Chem. Rev.* 99, 1801, 1999.
2) Nanolithographic techniques, including e-beam lithography, have been reviewed by Marrian et al., "Nanofabrication", C. R. K. Marrian, D. M. Tennant *J. Vac. Sci. Technol.* A 21(5), 2003.

Part VI: Fabricating Large Nanopattern Arrays Using Scanning Probe Lithography

The following provides two embodiments for the fabrication, with scanning probe lithography, of large numbers of nanostructured stamps on a single substrate, typically a wafer. This is useful when the high resolution of SPL is required but its low throughput is problematic.

Parallel Scanning Probe Lithography

In a first embodiment, the invention provides a method for the fabrication of a large array of nanostructured stamps, said method comprising the steps of: (i) providing an array of probes; (ii) providing a substrate; (iii) pattern said substrate with said array, all or some probes operating in parallel; (iv) transferring said array of patterns by further processing of the substrate. In a preferred embodiment, this array may be an array of substantially parallel microfabricated cantilevers incorporating microfabricated tips. Such an array of probes may be fabricated using microfabrication methods known to the art. Arrays of parallel probe adapted to parallel dip-pen nanolithography may be purchased from NanoInk, Chicago, Ill. See, e.g., U.S. Pat. No. 6,642,129 to Liu et al., which is entitled "Parallel, individually addressable probes for nanolithography".

Step-and-Repeat Scanning Probe Lithography

In another embodiment, a method for step-and-repeat scanning probe lithography is disclosed that allows the fabrication, in a serial manner, of arrays of multiple identical patterns. Typically, these patterns are separated by a large distance relative to the characteristic dimension (e.g. hundreds of microns between micron-sized patterns). It comprises of the steps of: (i) positioning the probe(s) at a first location of the substrate to be patterned; (ii) contacting at least one probe with said substrate; (iii) patterning the substrate in the close proximity of the contacting point (typically within 90 um thereof) using the probe; (iv) separating the probe from the substrate, typically by a distance in the range of 5-300 um; (v) repeating steps i-iii at other locations, until all target locations have been exhausted.

This sequence may be implemented as a software routine associated with an instrument driver controlling at least one instrument capable of step-and-repeat lithography. FIG. 20 illustrates an example of the step-and-repeat process. The scanning probe instrument comprises a cantilever 10 which tip 00 is placed in contact with the surface 40 by the tip positioning system 20, 30, 50 sequenced by the controller 70.

In a companion embodiment, the invention provides a scanning probe nanolithography instrument capable of step-and-repeat lithography. It may comprise of (a) a stage supporting a substrate; (b) a head comprising of at least one probe and the associated probe holder; (c) a mechanism for the coarse translation of the substrate relative to the head, typically a stage equipped with stepper motors; (d) a fine translation mechanism, typically a piezoelectric actuator, capable of scanning one or more probe(s); (e) automated means of creating or rupturing contact between said probe(s) and the sample, including means of detecting said contact; and (f) associated enabling electronics and software. Scanning probe instruments combining fine and coarse translation mechanisms may be purchased from Veeco, Metrology division, Santa Barbara, Calif.; Molecular Imaging, Phoenix, Ariz.; and Nanoink, Chicago, Ill.

A third embodiment consists of the combination of parallel scanning probe lithography and step-and-repeat lithography, in which a one- or two-dimensional array of substantially parallel probes is used with an apparatus capable of sequentially controlling the motion of said probe array with nanometer-scale precision.

Part VII: Resist Amplification

Existing Scanning Probe Lithography methods are capable of patterning with extremely high lateral resolution. However, SPL methods in some cases may not be optimized for integration with subsequent transfer process steps, such as etching or deposition. For example, the patterns that are formed by SPL patterning are usually very thin (often monomolecular); their chemical, physical stability and permeability limit their use as a resist (for example, they may have poor selectivity compared to their substrate in an etching process, resulting in low aspect ratios). In addition, SPL methods may not be compatible with standard microfabrication processes (e.g. cleaning steps) or may chemically contaminate standard microelectronics equipment.

Dip Pen Nanolithography printing and other methods, for example, often use self-assembled monolayers (e.g. mercaptohexadecanoic acid) which are monomolecular in thickness. Their small height and poor resistance to metal penetration may in some cases prevent their use with lift-off techniques. Plasma etching methods are generally suspect due to their immediate ashing. The choice of possible subsequent processing methods is in general restricted to a limited range of wet etching methods, as in the method of Zhang et al. In contrast, SPL methods that use or produce resilient inorganic resist (such as oxidation nanolithography) are plagued by low throughput. Therefore, it is often desirable to process the resist further in order to prepare it for further processing or modify the SPL method itself.

Resisting processing may include cross-linking between molecules in the resist pattern or using the pattern as a template to trigger e.g. the selective deposition of a compound with higher resilience to a subsequent process step.

Part IX: Stamp Duplication Technology

High-throughput embossing machines used for brand protection and in other applications usually operate in a parallel manner, imprinting multiple objects simultaneously using multiple identical stamps. There is therefore a need for a method to fabricate multiple identical copies of nanostructured stamps from an original (i.e. a master). Thus, another embodiment of the present invention consists of a method for the fabrication of one or more daughter stamp(s) from a master micro- and/or nanostructured mold. Said method comprises of the steps of:

(1) Providing a nanostructured mold prepared by micro- and/or nanolithographic methods known to the art,
(2) Optionally cleaning said mold,
(3) Optionally preparing the surface of the master mold, for example by deposition of a surface agent, for example a release agent,
(4) Depositing a replication film,
(5) Optionally planarizing the surface of said film e.g. by polishing or by depositing a planarization layer,
(6) Optionally, bonding the stack comprising the mold, replication film (and optional planarization layer) to a handle substrate (typically a handle wafer),
(7a) Separating the master and daughter at the interface between the master and the replicating film, or
(7b) Selectively destroying the master stamp e.g. by etching or dissolution;
(8) Using the daughter stamp (or a part thereof) to encode information on one or more objects or compositions.

After step 7b, optionally, singulating (e.g. dicing or laser cutting) can be carried out the daughter. Singulation may occur before or after separation/etching.

This templating/molding/bonding technique is useful in preparing hard, durable, mechanical-failure-resistant stamps from brittle masters, such as these etched into silicon, or soft ones, such as replicates prepared by polymer molding. Cleaning methods include but are not limited to RCA2 wash (3:1:1 water, hydrogen peroxide, ammonium peroxide per volume), isopropanol/distilled water wash, short plasma ashing, which remove particulate and other contaminants that may affect subsequent steps. Film deposition methods include (a) electroplating or electroforming; (c) electroless deposition; (d) physical vapor deposition (PVD), including vacuum evaporation and sputtering; and (e) chemical vapor deposition (CVD). The replication film deposited in step (4) preferably deposits conformally, e.g. espouses the surface topography at the length scale of interest (e.g. the nanoscale) without forming voids, cracks, undue grain boundaries and other defects. It must also be thicker than the height of the nanostructures found on the master. Depending on the deposition technique being used, the surface of the stack comprising the mold and replication film may not be flat enough to ensure a good, uniform contact necessary to certain forms of bonding. It may be also disadvantageous to leave air pockets between the replication layer and the handle wafer after bonding. Step (5), which includes but is not limited to polishing, chemical mechanical polishing, planarization by spin-coating a thick layer of resist, increases the flatness of the top surface of the replication film to favor bonding.

Bonding methods in step (6) include:
1. Anodic bonding, esp. when using certain metallic and ceramic films as the replication film and Pyrex (borosilicate) wafers as the handle, may be used.
2. Direct wafer bonding, esp. between a silicon nitride film and Pyrex handle.
3. Gluing by dispensing an adhesive onto either substrate and contact them,
4. Soldering, brazing and other uses of low-melting-point alloys,
5. Deposition of a thermoplastic polymer, heating above the softening point, and pressing the substrates together.

The surface agent may facilitate the separation of the master from the daughter in step (7), for example by reducing or suppressing the adhesion of the replication film to the master surface. It may also be transferred to the daughter stamp during step (7), for example to impart its surface specific properties. For example, it may be advantageous to deposit an anti-fouling agent to a stamp in this manner. The surface agent typically forms a thin (monomolecular) conformal layer.

Methods of separation of the master and daughter stamps include but are not limited to (a) the application of a mechanical force orthogonal to the principal plane of the interface between the master and the daughter stamps; (b) the submersion of the master-daughter stack in a solvent that may induce its separation, possibly with the help with ultrasonic excitation; and (c) selective etching of the master substrate. It may be necessary to dice a large-area substrate in smaller units to facilitate the separation or to prepare for subsequent use. For masters prepared from silicon wafers, selective etching of the silicon in KOH or TMAH is a preferred method for step (7b).

The end result of this experimental protocol is a secondary stamp with an inverted surface topography (compared to that of the master stamp). Repeating the procedure twice, however, provides a replicate of the initial topography.

A preferred method is sputtering of a relative thick film (500 nm) followed by bonding. A working example for the preferred embodiment is provided herein. It is another object of the present invention to provide an article, called a multi-layered stamp, comprising of:
(1) a nanostructured layer, which comprises a principal surface, said principal surface comprising one or more nano- and/or microstructures.
(2) a handle substrate, which is usually thicker than the nanostructured layer and therefore provide mechanical support for the thinner layer, in addition to acting as a thermal sink or source; and
(3) optionally, an adhesion or planarization layer, which is found between the nanostructured layer and the handle substrate,
(4) optionally, a surface agent coating the principal surface of said stamp.

Those skilled in the art will acknowledge the existence of multiple functionally equivalent variants of the present embodiment which shall not be considered distinct from the present invention. For example, multiple adhesion and for planarization layers may be used. In addition, multiple handle substrates may be bound to one another to obtain a sufficient thickness or rigidity.

Part XI: Method of Deposition of a Anti-Fouling Layer

The (metallic) stamps fabricated using methods disclosed in the sections above, when repeatedly using for imprinting or embossing, are subject to contamination and fouling (sticking of residues to the stamp surface), which decrease imprint quality. This may be especially problematic with pharmaceutical compositions, such as tablets, which coatings typically contain sticky polymers and, being subject to FDA regulations, cannot be modified.

The present invention provides a method to form an anti-fouling layer on stamps to be used for the marking and embossing of pharmaceutical compositions, esp. for the purpose of anti-counterfeiting and inventory tracking. The anti-fouling layer may be formed during or after the fabrication of nanostructures on the stamp.

Anti-Fouling Layer Formed by Templating

In the former case, if the final stamp is prepared from a mold (e.g. by electroplating), the mold may be coated with (1) at least one thin conformal mold release layer, as described above (optional step); (2) at least one thin but non-necessarily conformal layer of material that will provide the required surface chemistry properties to the stamp; and (3) at least one thick layer making the bulk of the stamp. The master can then be dissolved or mechanically separated. For example, a silicon mold (prepared by many of the methods above) may be sequentially coated with (a) a thin layer of diamond-like carbon e.g. deposited by plasma-enhanced chemical vapor deposition (CVD); (b) a sputtered chromium layer, serving as the primer for electroplating; (c) electroplated nickel, the nickel forming the bulk of the stamp. Then the silicon mold may be dissolved to afford a DLC-coated metallic stamp.

Conformal Film and SAM Formation

In another embodiment, the anti-fouling layer is preferably a very thin, conformal overcoat, i.e. a film which deposition does not significantly alter the topography of the surface of the stamp. For example, it may also be a very thin (several nanometers) metal or inorganic layer deposited by physical vapor deposition or other method of choice. In a preferred embodiment, the invention relates to the use of self-assembled monolayers and other similar conformal thin films (often of molecular thickness) for the purpose of limiting the fouling of stamps used in brand protection-related nanoimprinting methods. A self-assembled monolayer may be formed on many substrates by immersion of the stamp in a solution of e.g. alkyl or perfluoroalkyl trialkoxy- or trichlorosilanes or by vapor deposition of the same compounds. U.S. Pat. No. 6,656,398 to Birch et al. (Corning), which is herein incorporated by reference, discloses the use of siloxane monolayers as release agents.

Part XII: Other Objects and Compositions

The present invention also applies to objects and compositions that are the target of counterfeiting or contraband due to a combination of factors, e.g. (a) objects of significant economic value, uniqueness or rarity; (b) products associated with a high intellectual capital; (c) products providing a critical function, thus associated with significant liability (esp. in the medical, nuclear, aeronautic or microelectronic industry); (d) item benefiting from a valuable brand recognition (for example luxury goods); as well as (e) easily duplicated, readily transported, fungible commodities commonly found on grey markets. In particular, the present invention applies to (1) pharmaceutical drugs, medical devices and consumables (including stents and catheters), vials, and surgical instruments; (2) securities and currencies; (3) textile fibers and filaments, and articles made thereof; (4) gems, jewelry; (5) microchips and other semiconductors assemblies, and (6) aircraft and automobile parts.

In its broadest sense, the invention enables (a) the fabrication of nanostructures, (b) their combination with meso- and microscale features, (c) the accurate duplication of said meso- and nanoscale features in a variety of substrates of varied geometries and chemical compositions; and (d) the high-throughput replication of said features on a variety of objects and compositions. Such methods will find applications e.g. in the fabrication of (i) electronic components and integrated circuitry; (ii) optical components, including suboptical optics and integrated optical circuitry; and (iii) microfluidic circuitry, including micro total analysis systems.

Further Literature Enabling Practice of the Invention

1) MEMS and Lithography

Background MEMS and nanotechnology information useful for practice of the present invention can be found in, for example, Marc J. Madou, *Fundamentals of Microfabrication, The Science of Miniaturization*, 2nd Ed., CRC Press, 2002. For example, chapter 1 describes lithography, chapters 2 and 3 define pattern transfer methods.

The text, *Microelectronic Circuits*, 4$^{th}$ Ed., by Sedra/Smith (Oxford, 1998) can be used to practice the present invention. For example, Appendix A describes VLSI fabrication technology including the IC fabrication steps of wafer preparation, oxidation, diffusion, ion implantation, chemical vapor deposition, metallization, photolithography, and packaging (including dicing and connections to pins to metallization patterns by fine gold wires). Other references include R. S. Muller and T. I. Kamins, *Device Electronics for Integrated Circuits*, 2nd Ed., New York, John Wiley, 1986 and W. R. Runyan and K. E. Bean, *Semiconductor Integrated Circuit Processing Technology*, New York, Addison Wesley, 1990.

2) Scanning Probe Lithography and Dip Pen Nanolithography

The invention may also be practiced with the help of the following references, which are hereby incorporated by reference in their entirety:

"Scanning Probe Studies of Single Nanostructures", G. S. McCarty, P. Weiss *Chem. Rev.* 99, 1983, 1999.

"Scanning Probe Lithography Using Self-assembled monolayers", S. Kramer, R. R. Fuierer, C. Gorman *Chem. Rev.* 103(11): 4367-4418 November, (2003).

"Nanofabrication with Proximal Probes", E. S. Snow, P. M. Campbell, F. K. Perkins *Proceedings of the IEEE* 85, 4 (1997).

"Nanometer-scale Surface Modification Using the Scanning Probe Microscope", Nyffenegger and Penner, *Chem. Rev.* 97, 1195-1230 (1997).

"Fabrication of Nanoscale Structures using STM and AFM", A. A. Baski, Advanced Semiconductor and Organic Nano-techniques, Part 3; Morkoc, Ed.; Academic Press, 2002.

"Nanolithography and Nanochemistry: probe-related patterning techniques and chemical modification for nanometer-sized devices" D. Wouters, U. S. Schubert, Angew. Chem. Int. Ed. 43, 2480, 2004.

Dip Pen Nanolithography has been reviewed by Ginger et al., "The evolution of Dip-Pen Nanolithography" D. S. Ginger, H. Zhang, C. Mirkin Angewandte Chemie-International Edition 43(1): 30-45, 2004.

3) Imprinting at the Micrometer-Scale

Methods of imprinting micrometer-scale structures known to the art include embossing, forming and injection molding, "Review on micro molding of thermoplastic polymers", M Heckele and W K Schomburg *J. Micromech. Microeng.* 14 (2004) R1-R14.

L. J. Lee reviewed the micro/nanoprocessing of polymers for the fabrication of BioMEMS, such as biochips and microfluidic circuits. That includes mold making techniques, reactive lithography and bonding, "BioMEMS and Micro-/Nano-Processing of Polymers—an overview" L. J. Lee, *J. Chin. Inst. Chem. Engrs.* 34, 1, 25, 2003.

All references, including the ones in the introduction sections, are hereby incorporated by reference in their entirety.

WORKING EXAMPLES

To further describe the invention, additional description is provided on process steps and variables including figures and non-limiting working examples.

Patterning and transfer of a large numbers of identical patterns Parallel scanning probe lithography An array of 11 or 26 cantilevers (depending on the experiment) with a force constant of ~0.05 N/m (NanoInk DPN probes style A-11 and A-26), was coated with mercaptohexadecanoic acid (MHA), more specifically by dipping them into an Acetonitrile solution containing MHA or by the following process: The cantilevers were dipped into acetonitrile with MHA, excess liquid was gently blown away using compressed air, the cantilevers were exposed to hot water steam and left in ambient conditions for drying. Then the cantilevers were again dipped in Acetonitrile containing MHA and finally excess liquid was again removed by gently blowing compressed air onto the cantilevers.

A silicon substrate was cleaned by ultrasonic actuation with acetone for 10 min, followed by rinsing with Milli-Q deionized water. The Si substrate was then immersed into a boiling solution of ammonium hydroxide and hydrogen peroxide ($V(NH_4OH):V(H_2O_2):V(H_2O)=1:1:5$) for 1 h. The cleaned substrate was rinsed with Milli-Q water and dried with $N_2$. The substrate was then put into a Varian Electron Beam Evaporator (UIC) chamber and under vacuum conditions (pressure $<10^{-7}$ Torr), the substrate was coated with a 1 nm Ti adhesion layer via electron-beam evaporation and subsequently coated with Au (10 nm) via electron-beam evaporation to produce a continuous Au film.

Figure 19:
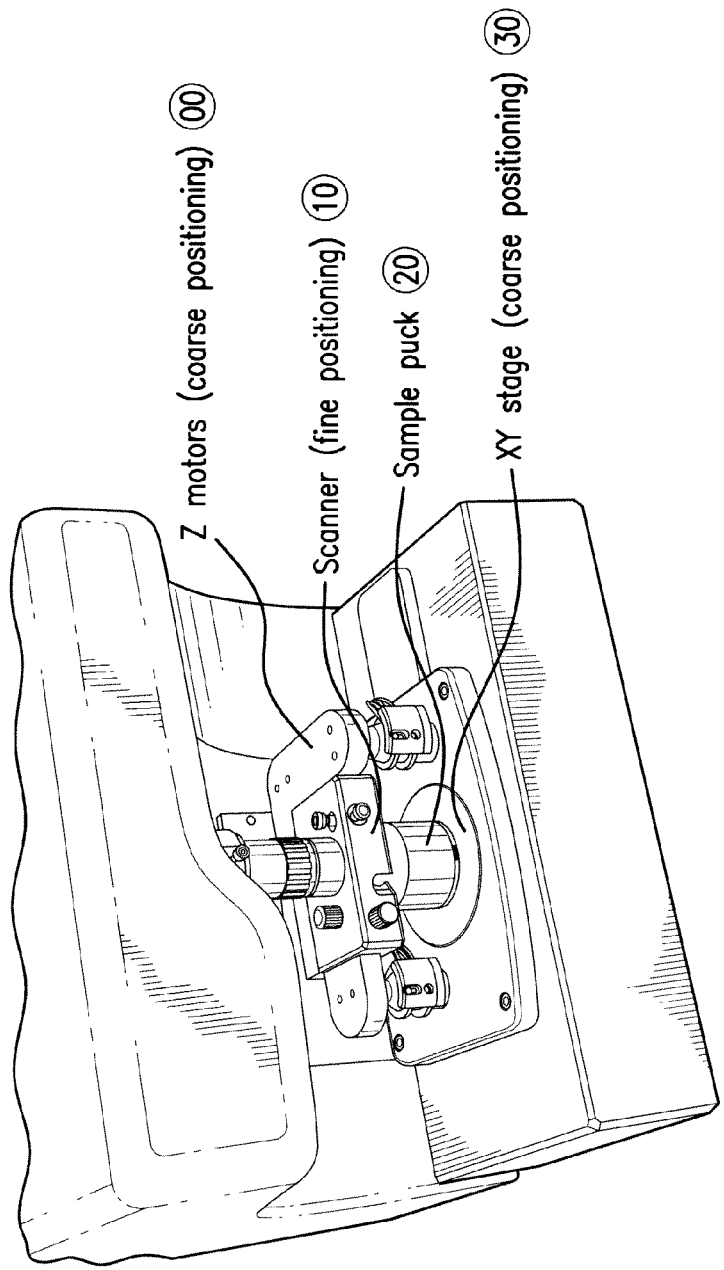
FIG. 19 illustrates NSCRIPTOR™ instrument.

The array of cantilevers was then used to pattern the prepared silicon sample using an NSCRIPTOR™ instrument (NanoInk, Inc, Chicago, Ill.) see FIG. 19, under ambient conditions (probe set point=0.5 nN, 22-24° C., 30-36% relative humidity). Due to the leveling capability of the instrument, the array of cantilevers writes in parallel with one copy for each of the cantilevers involved. This produces redundant patterns that increase overall pattern yield. The resulting array of MHA nanopatterns was then transferred to the underlying gold film by cyanide etching. In particular, the Au substrate was immersed in a ferri/ferrocyanide etching solution (a 1:1:1:1 (v:v:v:v) aqueous mixture of 0.1 M $Na_2S_2O_3$, 1.0 M KOH, 0.01 M $K_3Fe(CN)_6$ and 0.001 M $K_4Fe(CN)_6$) for ~10 min under constant stirring to remove the Au layer from the exposed regions of the Au substrate. After rinsing with Milli-Q $H_2O$, the etched substrata was dried with $N_2$.

The Ti adhesion layer may be optionally wet-etched. A subsequent dry silicon etching step yielded an array of identical silicon nanostructures. Technical literature including experimental descriptions for these processes can be found in the following references which are hereby incorporated by reference in their entirety: "DPN-generated nanostructures made of gold, silver, and palladium", Zhang, H., Mirkin, C., Chem. Mater. 2004, 16 (8), 1480-1484 as well as (a) Zhang, H.; Li, Z.; Mirkin, C. A. *Adv. Mater.* 2002, 14, 1472. (b) Zhang, H.; Chung, S. W.; Mirkin, C. A. *Nano Lett.* 2003, 3, 43. (c) Zhang, H.; Lee, K. B.; Li, Z.; Mirkin, C. A. *Nanotechnology* 2003, 14, 1113.

To produce the three-dimensional shape of the stamps, the silicon sample was etched for 1.5 minutes in a Technics Micro RIE with 4 sccm SF6 gas at an RF Power=100 Watts. The pressure was ~70-100 mT (uncontrolled). After silicon etching, the masking gold and titanium layers can optionally be removed using corresponding wet etch baths. Pressing the silicon piece onto a pharmaceutical tablet yielded an imprint of said pattern array. The optimal conditions for film-coated tablets were as follows: time=1 to 3 s, Temp=100-110° C., pressure=5-10 MPa. For soft, liquid-filled caplets, the optimal conditions were as follows: time=3 s, Temp=80 C, and Pressure=13 MPa.

The equipment and supplies necessary to reproduce this experiment, including arrays of identical cantilevers, scanning probe nanolithography apparatus and software to control it, are commercially available from NanoInk, Inc. (Chicago, Ill.). Chips featuring array of dissimilar cantilevers are also available from Veeco (Woodbury N.Y.) and MikroMasch (US sales office in Portland, Oreg.). For purposes of this application, the inventive features do not reside in the instrument for using the stamp.

Metal Daughter Stamp Fabrication using Sputtering and Wafer Bonding

A metallic daughter stamp has been fabricated starting with a silicon master, following the method disclosed in the example "parallel scanning-probe lithography" above.

To briefly summarize, (a) a thin film of Ti and Au was deposited on a silicon wafer; (b) the wafer was patterned using dip-pen nanolithography of mercaptohexadecanoic acid (MHA); (c) the MHA pattern was transferred to the gold layer by ferri/ferrocyanide etching; (d) the Ti adhesion layer may be optionally wet-etched; and (e) the resulting gold nanostructures were used as a reactive ion etching mask. In typical operation condition, a $SF_6$ plasma was generated at a pressure between 10-100 mTorr range by applying between 100 and 800 W of RF power and a 100 V bias. The titanium/gold pattern, which acted as a mask during RIE, may be optionally removed by immersion of the substrate in the corresponding wet etch baths.

The stamp was rinsed with distilled water then isopropanol and dried under a nitrogen jet. A 5000 Angstrom-thick layer of Titanium, Aluminum or Chromium was then sputtered at a rate of ~0.6 Å/s (for Ti) to 2 Å/s (for Cr) using 5 mTorr of Argon. This method is capable of depositing a film on nanostructures with an aspect ratio at least 1:1 (depth/width), and more specifically at least 3:1. The metal-coated silicon stamp was then briefly polished, cleaned, left in air for a short period of time to form a superficial oxide, then bonded to a Pyrex handle wafer using anodic bonding. A 400 V bias was applied when maintaining a 400° C. bonding temperature. The silicon master wafer, 525 um in thickness, was dissolved in KOH (30% by weight, 80° C. typical) or TMAH (20-25% by weight typical).

Stamp Electroforming

A metallic replicate of a silicon master stamp is fabricated, following the method disclosed above.

A 4" Silicon wafer is coated with a gold thin film, patterned with Dip Pen Nanolithography, then immersed in a cyanide batch and submitted to reactive ion etching to form a primary stamp comprising a variety of patterns 100-400 nm in lateral dimension and 50-100 nm in depth. A 200 nm seed layer is sputter deposited onto the stamp to create a conductive surface suitable as an electrode. The sample is then mounted on a carrier wafer and conductive tape is connected to the rim and partially on top of the sample, but not on the nanostructured patterns, to increase current flow during plating operation. 50 to 75 um of a nickel-cobalt alloy ("NiCo") is then electroplated over the entire exposed surface. The plated material is then separated from the wafer by dissolution of the silicon in concentrated KOH.

In a first experiment, 100 nm of Cr followed by 100 nm of Cu is deposited, followed by 50-75 um of NiCo. In a second experiment, 100 nm of nickel-chromium alloy (80% Ni-20% Cr) plus 100 nm Cu is sputtered. 50-100 um of NiCo is then electroplated. Other materials suitable as a seed layer include Rhodium and Platinum. Nickel may be electroplated instead of NiCo. The relatively thin metallic replicate can then be bonded to a back-end substrate, such as a Pyrex wafer or a solid metallic plate, using adhesives known to the art. It is also possible to thicken the electroplated deposit (e.g. above a millimeter) by lengthening the electroplating duration (e.g. up to two days), in order to obtain a standalone metallic replicate that can then be directly mechanically mounted on an insert. Plating baths may be purchased from Dynamics Research Corporation, Metrigraphics division, Andover, Mass. Electroplating equipment may be purchased from TecNu, Littleton, Colo. or Technic, Inc., Cranston, R.I.

Electroless Deposition

A metallic replicate of a silicon master stamp has been fabricated by electroless deposition of Nickel. After cleaning, the silicon master stamp was sputter-coated with thin successive layers of Titanium, Palladium and Nickel (or dipped into a Pd catalyst solution), then immersed in a Nickel electroless bath (available e.g. from Rohm & Haas Shipley, Marlborough, Mass.) for at least one hour. The metallized stamp was rinsed with double deionized water and isopropanol, dried with a nitrogen jet, before gluing to a borosilicate glass wafer (e.g. from Schott Lithotec, Poughkeepsie, N.Y. or Hoya Corp. Optics, San Jose, Calif.) using UV-curable adhesive e.g from Epoxy Technology (Billerica, Mass.) or Electro-Lite Corporation, (Danbury, Conn.). UV curing equipment may be purchased from LESCO, Torrance, Calif. The assembly was then immersed in concentrated potassium hydroxide until complete etching of the silicon, affording a Nickel replicate bonded to a glass substrate.

Direct Metal Etching

This example demonstrates the fabrication of a stamp by direct patterning of a metal substrate (or a metal thick film on a substrate).

Figure 14:
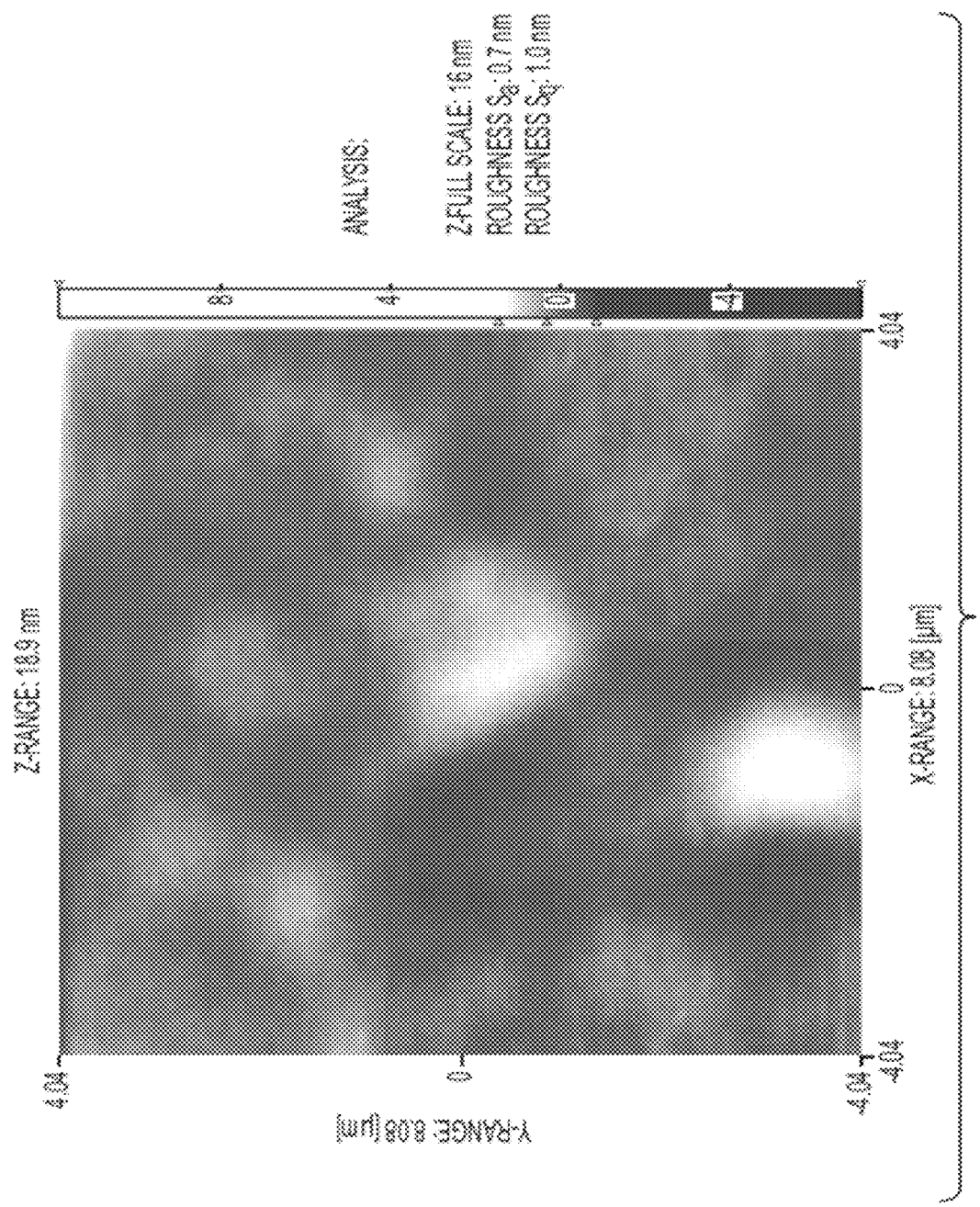
FIG. 14 illustrates AFM imaging of CMP polished Ti.

An alternative process is to form the stamp directly onto a non-brittle metal substrate that can be used as the stamp itself. Titanium is one metal that can be used for this purpose. It is not brittle, it has a modulus of elasticity very similar to that of silicon, and its density is similar as well. It can be fabricated into disks with the same form factor as silicon wafers. Goodfellow Materials can supply polished Ti disks ready for processing. Ti can also be etched with a fluorine plasma in a reactive ion etcher used for etching silicon. A Titanium disk, 4 to 6 inches in diameter, purchased from e.g. GoodFellow Corp. (Devon, Pa.), is first cleaned. It is then inserted into a chemical-mechanical polishing (CMP) machine. Using appropriate chemicals and operation parameters, the Titanium disc is smoothed until the surface roughness is approx. 1 nm while larger scale flatness is within 30 nm as shown in FIG. 14. After another cleaning step, the Titanium surface is coated with 1 to 3 nm of titanium and approx. 10 nm of gold in an e-beam evaporator. The thin layer of titanium ensures good adhesion of the gold layer to the titanium oxide layer that naturally forms on the titanium substrate. The substrate is then introduced into a large-stage scanning probe microscope (Nano-I, Pacific Nanotechnology, Santa Clara, Calif.) controlled by a customized version of a nanolithography software package (NanoInk, Inc.; Chicago, Ill.). The substrate is then processed in a manner similar to the parallel scanning-probe lithography example above. Briefly, mercaptohexadecanoic acid is deposited atop the gold via Dip Pen Nanolithography, forming several arrays of lines approximately 200 to 300 nm in width. The gold-coated substrate is then wet etched using ferri/ferrocyanide. Once the gold is patterned it can be used as an etch mask for the underlying titanium(bulk)/titanium oxide/titanium (film) stack is processed in a dry etcher in conditions similar to that of a silicon wafer. The Ti disk is loaded into a reactive ion etcher and the patterns are etched 100 nm into the Ti material. One example of an etch process for Ti can be found in Zhang et al, Titanium Bulk Micromachining for BioMEMS Applications: A DEP Device as an Example, Proceedings of IMECE: 2004 ASME INTERNATIONAL MECHANICAL ENGINEERING CONGRESS AND RD&D EXPO Anaheim, Calif., USA, Nov. 13-19, 2004 IMECE 2004-62136. After etching, the remaining gold can be stripped off. Further, the titanium wafer may be coated with a thin photoresist film for protection, then diced with a dicing saw. Typically, the disk is mounted on dicing tape and then diced all way through on a high-speed dicing saw using a diamond-impregnated dicing blade at 20,000 rpm. The disk is cleaned in an ultrasonic or Megasonic cleaning bath or with a high pressure deionized water spray. Alternatively, the disk may be diced using a high powered laser to ablate away the kerf in between the individual stamps. The resist, if present, is removed.

The result is a nanostructured stamp made of titanium, which has superior thermal, mechanical properties and chemical compatibility compared to silicon. Such stamp may be directly used, without additional replication or duplication steps into a metal daughter stamp, for the hot embossing of pharmaceutical compositions.

Resist Amplification

Figure 15:
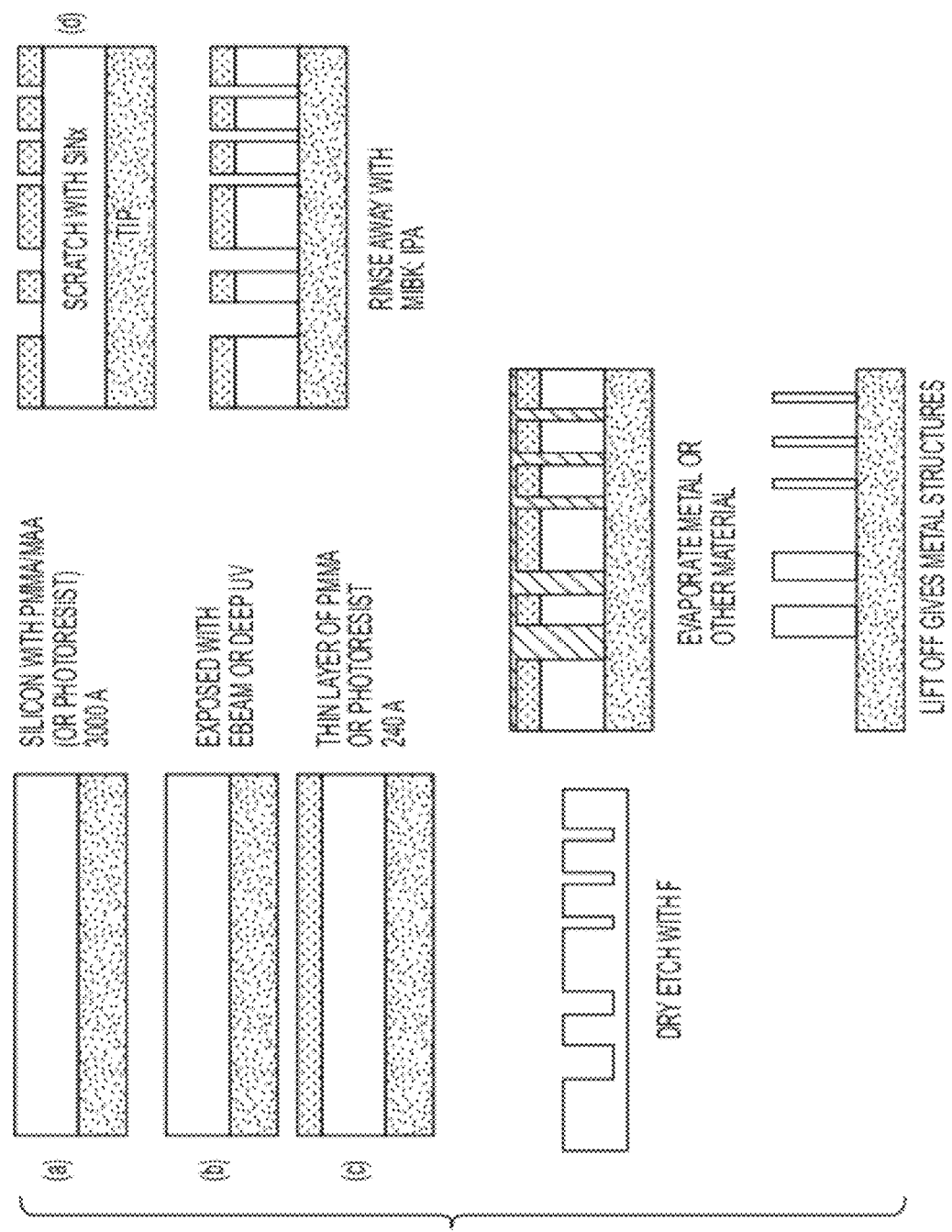
FIG. 15 illustrates a lift off process for stamp fabrication.

The following example improves on the method disclosed in Sohn and Willett, Appl. Phys. Lett. 67(11), 1552, 1995, (or variants thereof) to fabricate nanostructured stamps to be used for brand protection. A substrate wafer of silicon is spin-coated with a first resist (9% polymethyl methacrylate/methylacrylate acid (PMMA/MAA) in Cellosolve), baked 1 hour at 165-170° C. in an oven, then blanket exposed with i-line ultraviolet light during 5 minutes. A standard lift-off resist such as ma-N 400 Photoresists for Lift-Off Processes by Microresist (Berlin, Germany) or LOR 0.5 A by Microchem (Newton, Mass.) may also be used A thin polymer layer (496K PMMA 1% in chlorobenzene) is then spun on top but not baked. A custom scanning probe nanolithography tool (Nano-I, Pacific Nanotechnology, Santa Clara, Calif., with InkCAD software, NanoInk, Inc., Chicago, Ill.) is then used to pattern the top layer by applying a high force with an Atomic Force Microscope tip, in effect locally scratching the top coat. The substrate is then rinsed with a mixture of methyl isobutyl ketone (MIBK) and isopropyl alcohol (IPA) to locally remove the second resist layer at the location of the scratch marks. Because the top resist dissolves more slowly than the first, it is essentially undercut. A subsequent (metal) deposition step, if it is substantially anisotropic (e.g. PVD) and of a thickness inferior of that of the first resist, results in a discontinuous film that can be lifted off. Lift-off can for example be done with MicroChem's Remover PG, by first immersing the sample into the remover at 60 degree C. for 30 minutes under ultrasonic action and the at 60 degree C. for 30 minutes in a second tank under ultrasonic action. The main steps of this process can be seen in FIG. 15. The result is a (metal) pattern with substantially the same line width than that of the initial pattern in resist and higher aspect ratio. The assembly comprising the substrate and the patterns is then used as a stamp.

Soft Lithography as a Stamp Replication Technique

This example demonstrates that soft lithography, see e.g., "Soft Lithography" Y. Xia, G. M. Whitesides Annu. Rev. Mater. Sci. 1998, 28, 153; "Unconventional methods for Fabricating and Patterning Nanostructures", Y. Xia, J. A. Rogers, K. E. Paul, G. M. Whitesides, Chem. Rev. 1999, 99, 1823, combined with etching techniques, is a valid replication technique for stamps to be used for brand protection.

First, a mercaptohexadecanoic acid pattern is prepared on a gold-coated substrate using microcontact printing (μCP), "Microcontact printing of self-assembled monolayers: applications in microfabrication", Wilbur, J. L.; Kumar, A.; Biebuyck, H. A.; Kim, E.; Whitesides, G. M., Nanotech. 1996, 7 (4), 452-457. Briefly, a silicon wafer is coated with titanium (1 nm) and gold (10 nm) by e-beam evaporation (pressure $<10^{-7}$ mbar). A polydimethylsiloxane (PDMS) microcontact printing stamp is prepared by dispensing a polymer precursor, prepared from a commercial kit (Sylgard 184 from Dow Corning (Midland, Mich.)) onto a master, in this example a commercial grating featuring a square lattice of dots.

After curing in an oven at approx. 100° C. for 45 minutes, the stamp is immersed in 10 mM mercaptohexadecanoic acid (MHA) in ethanol, air-dried, then placed in contact with the gold-coated substrate for 10 seconds. During this step, MHA is patterned onto the gold coated silicon wafer. Next, the MHA patterned wafer is processed according to the method outlined in parallel scanning-probe lithography example. This results in a faithful replication of the feature dimensions in X and Y (in-plane) of the soft lithography stamp used while the feature depth Z entirely depends on the dry etching conditions and parameters. The assembly comprising the substrate and the patterns is then used as a stamp.

Figure 12:
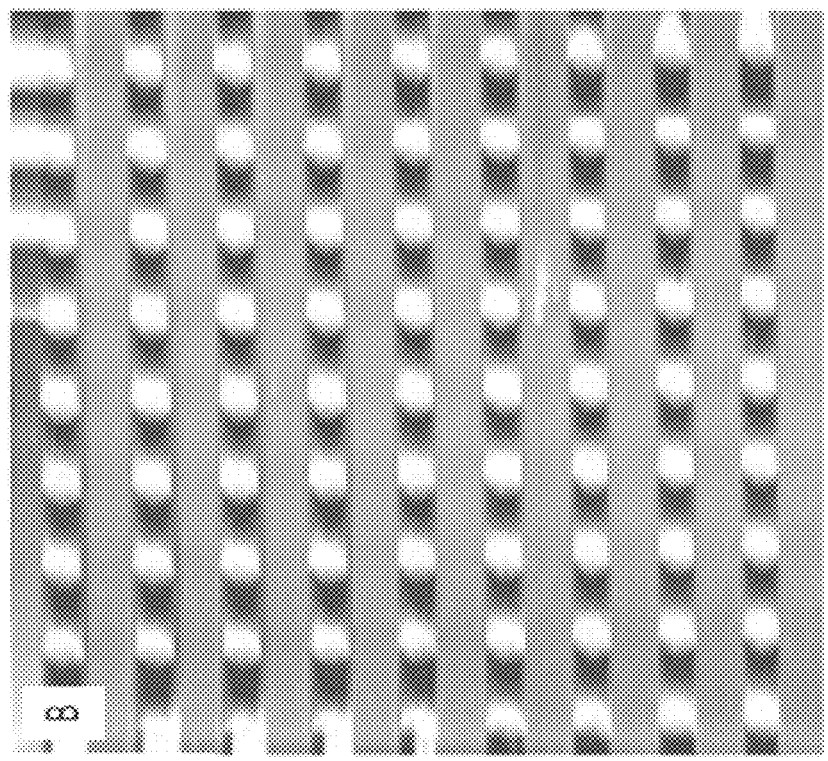
FIG. 12 illustrates AFM imaging of soft lithography results.
Figure 12:
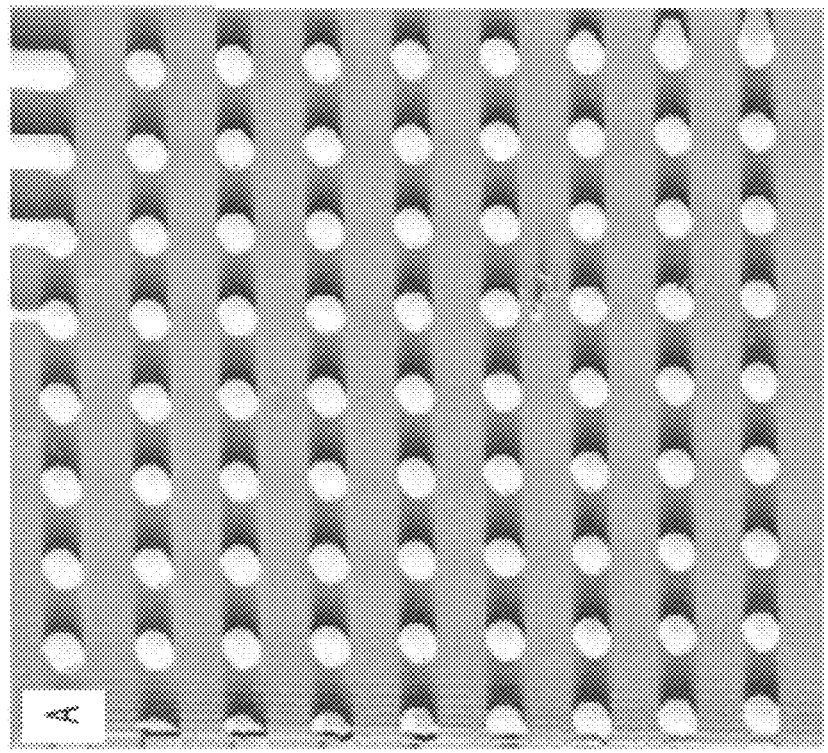
Figure 13:
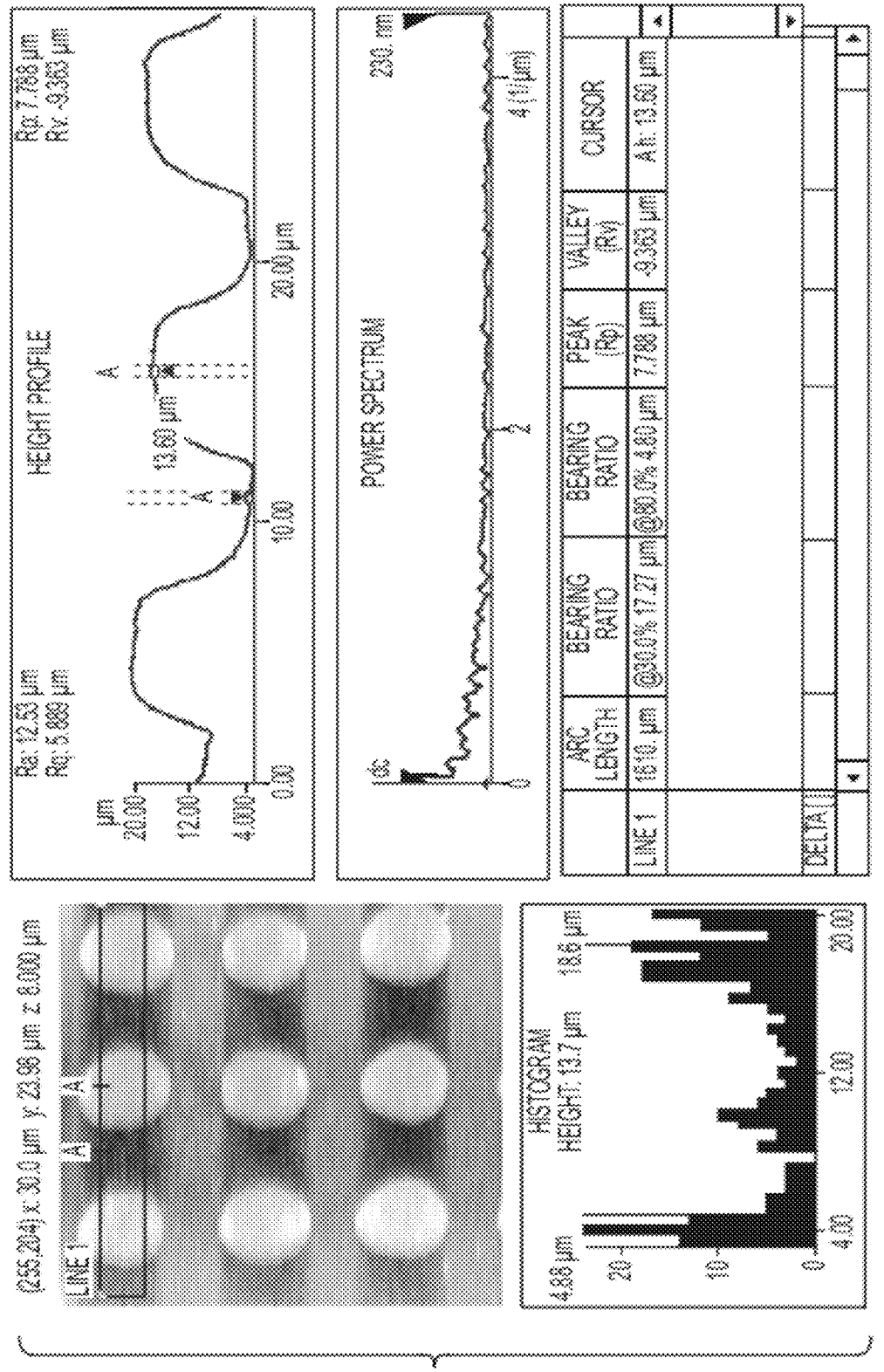
FIG. 13 illustrates section analysis of AFM image of gold microdots on Si.

These patterns are imaged using AFM and error-signal (cantilever deflection) and topography are illustrated in FIG. 12. FIG. 13 shows a smaller AFM scan of the same sample and height analysis thereof. The etched height of these features is approximately 14 nm. While in this example, a larger-scale dot array was used as the master, a person with ordinary skill in the art will appreciate that a nanostructured stamp may be used with this technique. Other materials may be deposited and other soft lithography techniques may be used.

Deposition of a Conformal Coating

Figure 11:
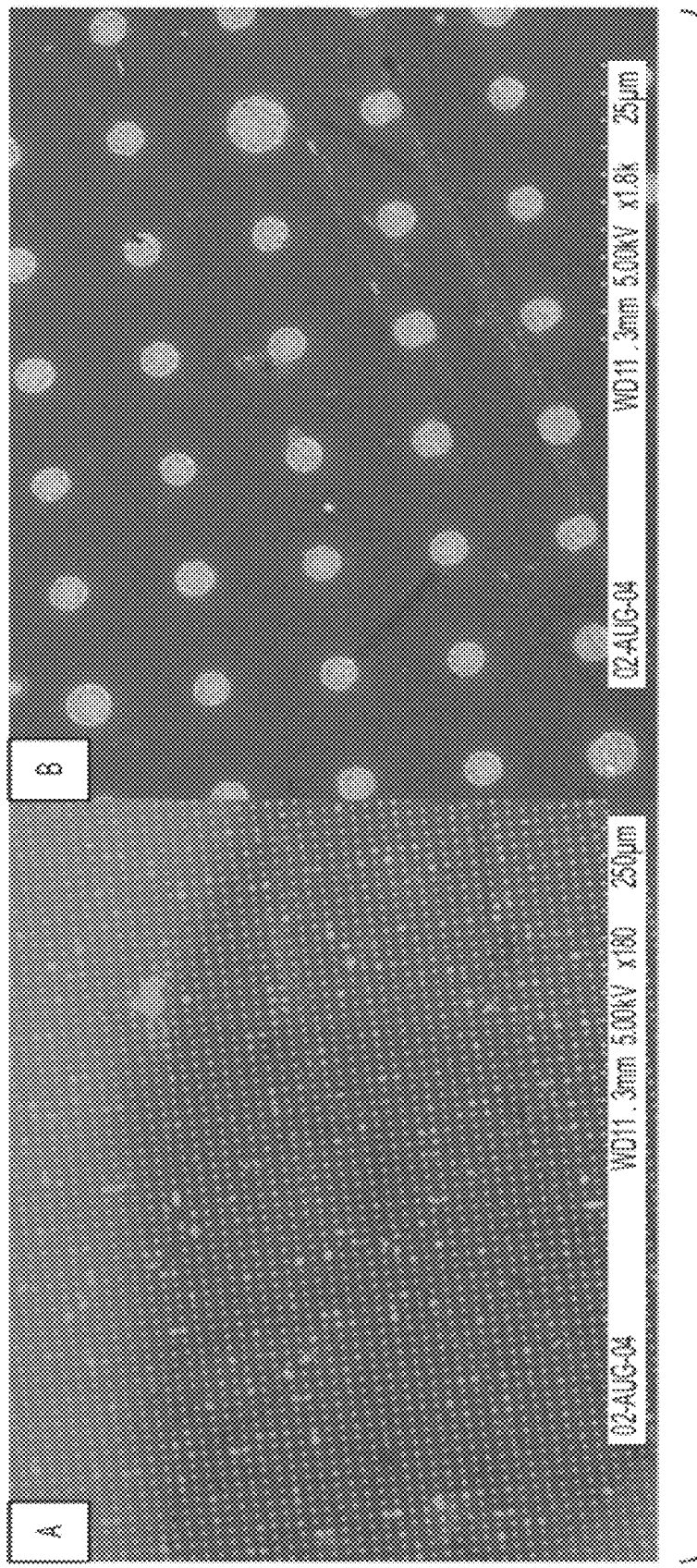
FIG. 11 illustrates chromium coated stamps.

This example illustrates the deposition of a thin, conformal coating on the top of a micro- or nanostructured surface to improve its usefulness as a stamp (e.g. in term of mechanical resilience, anti-fouling properties and compliance e.g. with FDA rules). The stamp fabricated by the previous example was further coated using e-beam evaporation with a 50 nm to 100 nm-thick film of Chromium. FIGS. 11A and B are secondary-electron Scanning Electron Micrographs of a small portion of that stamp. Chromium is a harder and more biocompatible material than silicon and is thus a superior first surface for contact with pharmaceutical units. Imprinting with this stamp on commercial tablets yielded reproducibly good replications using the same imprinting parameters as on an un-coated stamp. Other coatings that can improve hardness include ultrananocrystalline diamond from Advanced Diamond Technologies, Inc (Champaign, Ill.) or other pure or mixed metal combinations.

Conformal Coatings can also be useful to make the stamp surface more repellent to contamination from the pharmaceutical unit which might potentially lead to feature clogging and reduced imprint quality. Various coatings are used in the pharmaceutical industry, for example isometric coating by Isometric Micro Finish Coating Co. (Edison, N.J.). Single-molecular and very thin coatings, typically chemical relatives of Teflon, can also be deposited using for example Molecular Vapor Deposition using the MVD 100 system by Applied Microstructures (San Jose, Calif.).

Furthermore, some of the samples processed according to the parallel scanning-probe lithography example were coated with fluorocarbon using a STS DRIE (deep reactive ion etching) system operating with 85 sccm C4F8 and 8.5 sccm Ar gases for 16 seconds under the following conditions: Platten power (substrate RF bias)=30 Watts, coil power (ICP)=600 watts, APC (throttle valve position)=67 degrees. Furthermore, an amorphous fluorocarbon polymer, e.g., Cytop spin on polymer can be introduced on the etched silicon sample after processing as detailed in the parallel scanning-probe lithography example.

Stamp Duplication using Nanoimprint Lithography

Figure 16:
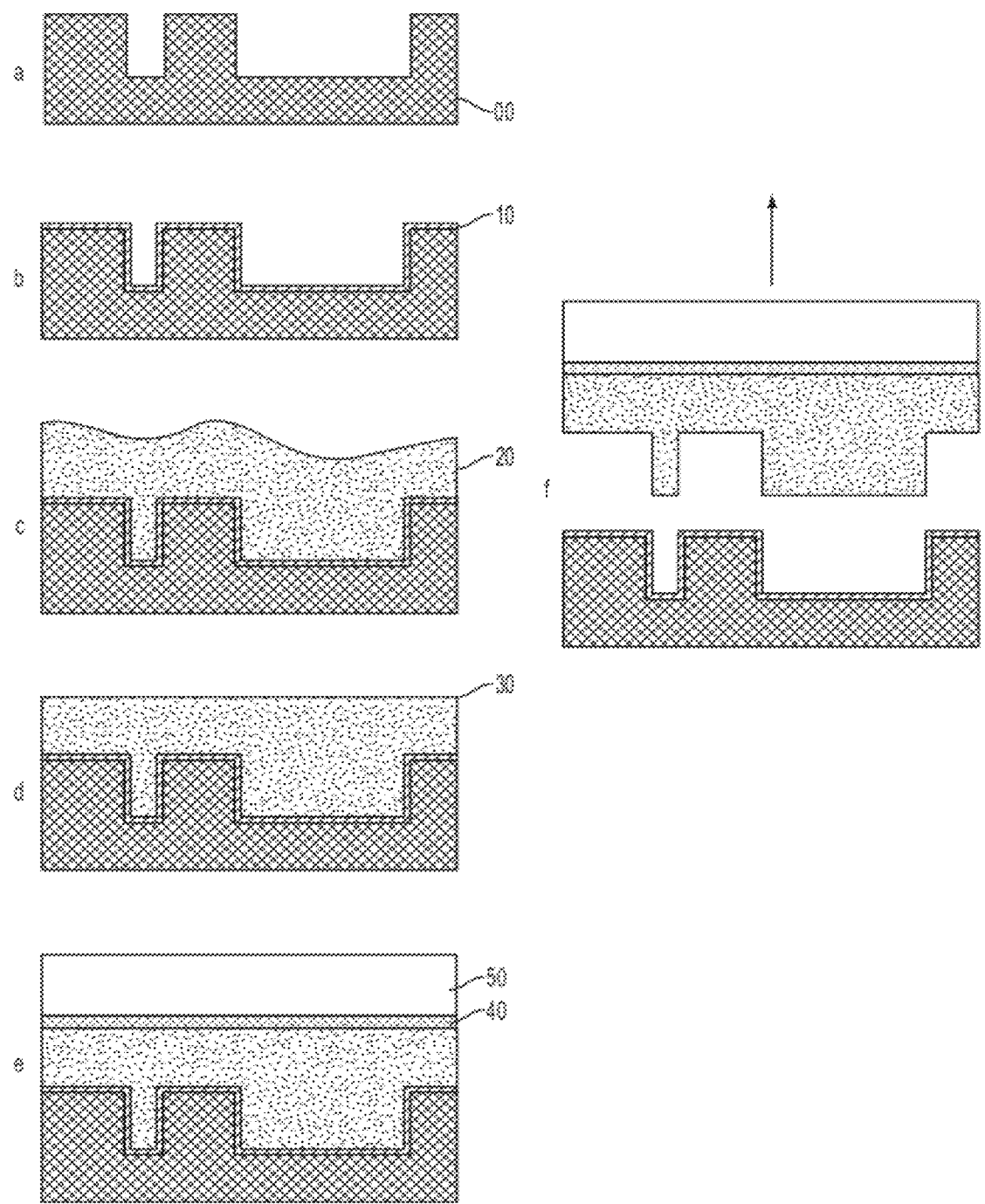
FIG. 16 illustrates stamp duplication.
Figure 18:
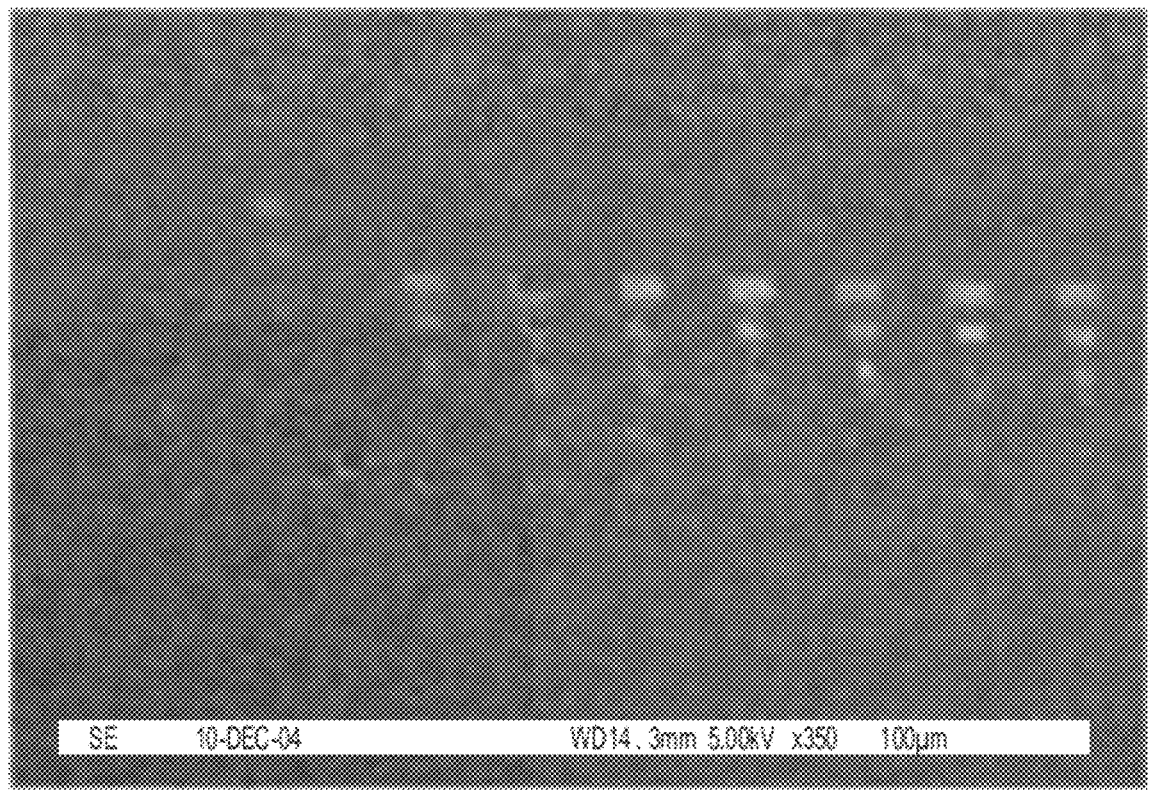
FIG. 18 illustrates a daughter replication.

Nanoimprint lithography equipment and related tools may be purchased from EV Group (Schaerding, Austria), Suss Microtech (Garching/Munich, Germany), Obducat (Malmo, Sweden), Nanonex Corp. (Monmouth Junction, N.J.), or Molecular Imprints (Austin, Tex.). It is also possible to use services offered by third parties knowledgeable in the art, such as Holographix LLC (Hudson, Mass.). A stamp fabricated as described in the parallel scanning-probe lithography example was cleaned using aqua regia to remove all gold and using an RCA cleaning process to rid the substrate of all organic contaminants. This substrate 00 (FIG. 16) can optionally be coated with a thin coat of release agent 10. It was then shipped to Holographix where the following basic process was used to produce a replication: A liquid solution 20 of a specialty polymer was flown over the sample features. Alternatively, the sample can be approached from the top into a dish containing the liquid solution. After the liquid can sufficient time to penetrate into the smallest features, UV illumination is used to cure the polymer, hardening it in the process. If the liquid was introduced from the top, its top surface may have to be smoothed 30 before proceeding. After curing, the polymer is separated from the master sample. The polymer sheet can be held by vacuum force or van-der-Waals attraction, especially if it was held in a dish and the sample was approached from the top. Alternatively, a backing piece 50 can be attached to the hardened polymer using an appropriate adhesive 40 before separation of the master and its replication. A such prepared replication was imaged using SEM. The sample was first sputtered with 3 nm of Pt/Pd to produce a conductive thin-film that prevent charging. FIG. 18 shows the array of imprinted features that is a daughter replication of the original stamp.

Nanoimprinting on Packaging

Figure 17:
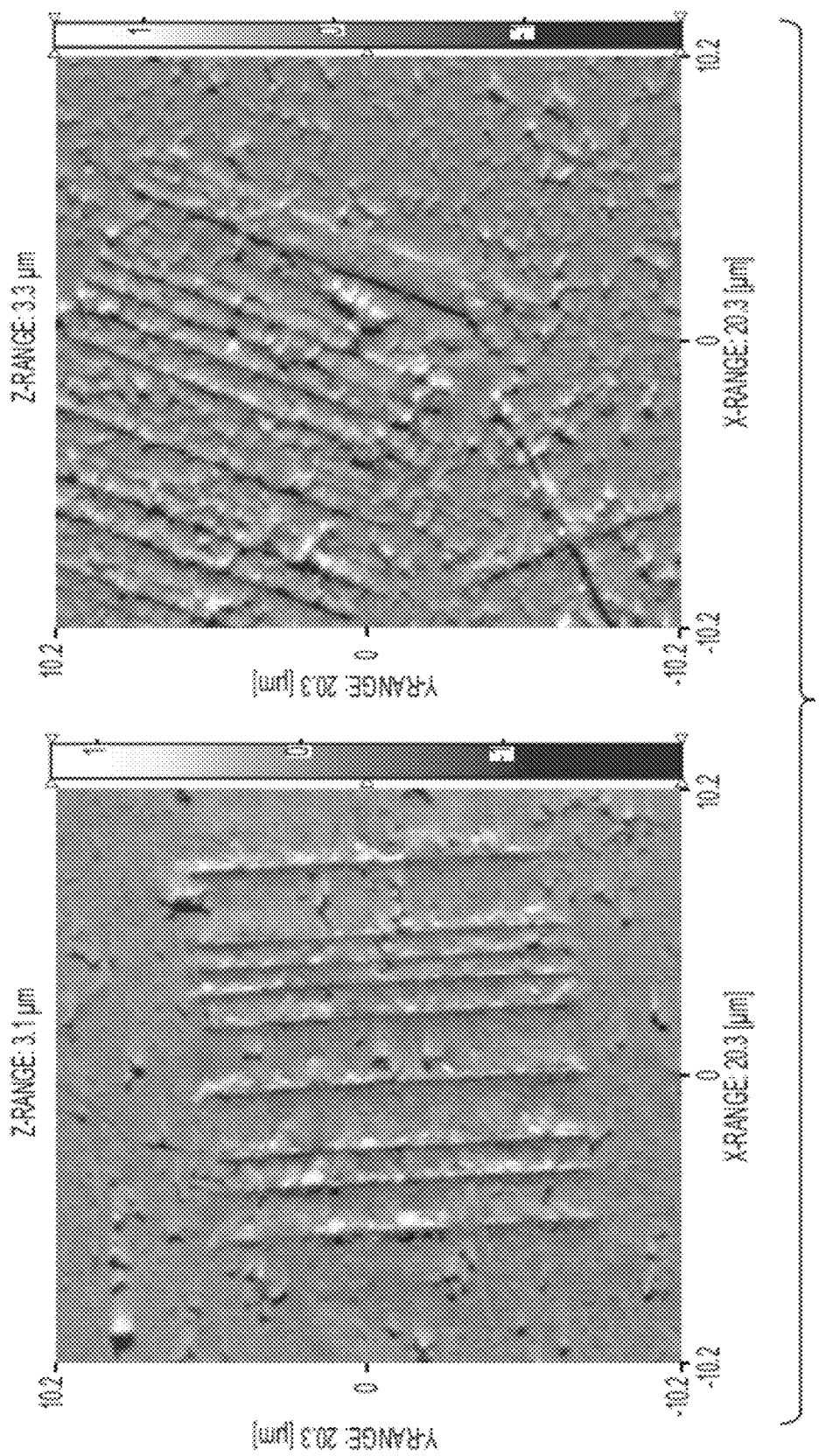
FIG. 17 illustrates imprinting of packing material.

Glossy coated paper, of the kind used for tablet packaging, was imprinted using a nanostructured stamp using the same technique than for tablets. FIG. 17 shows the Atomic Force Microscopy image (error signal channel) of two such imprints on a smooth coated paper labeled "Kromakote KK Glass C1S 10 pt" (obtained from Smart corporation; Mason, Ohio). Recommended imprinting conditions include a stamp temperature between 90° C. and 120° C., an imprinting force equivalent to 2.5-4.5 kg, and a contacting time between 1 to 3 s. Because the imprinted coating is apparently transparent, the imprints were virtually invisible to the naked eye and hard to find under an optical microscope, therefore essentially covert. In general, the quality of such imprints can be lower than what is observed on tablets, but it can be acceptable for micron-sized features.

Use of Optical Lithography

An alternative to DPN printing or direct write E-beam lithography is the use of optical photolithography using an advanced DUV (deep ultraviolet) 4× reducing stepper. Using an advanced stepper with 193 nm wavelength source, 200 and 400 nanometer patterns may be patterned onto wafers.

The following is a typical process:

First a mask or reticle needs to be produced by e-beam lithography. A 6×6×0.250 inch fused silica mask blank is prepared with sputtered chrome and e-beam sensitive photoresist. It is exposed with the pattern of the stamps in an e-beam lithography system. The e-beam sensitive resist is developed and patterned and the chrome is etched to form a binary mask with features four times the size as those needed on the wafer.

With the size of each stamp set to 1 mm square, a dicing kerf of 100 microns and a stepper field size of 26×33 mm, 690 different stamp patterns may be placed on each reticle. The size of each stamp can be, for example, 1 mm square or less, 0.8 mm square or less, 0.6 mm square or less, 0.4 mm square or less, or 0.2 mm square or less. For an 8 inch diameter wafer size, patterning 5 wafers produce enough stamps for each stamping machine batch.

To produce the stamps, one may clean and dehydrate wafers, apply adhesion promoter (HMDS), spin DUV photoresist, soft bake photoresist, expose patterns using DUV stepper (ASML PA5500 or equiv), post exposure bake resist, develop photoresist and hard bake photoresist. The stepper works by optically reducing the pattern on the reticle using refractive optics and printing a 4× reduced pattern onto the wafer. To pattern the entire wafer the wafer is moved (stepped) one field-size after each exposure to print the next field. The stepping is continued until the entire wafer is exposed. Using photoresist as an etch mask, the silicon is etched 100 nanometers deep using for example an inductively couple plasma reactive ion etching system. The photoresist is then stripped using an n-methyl-2-pyrrolidinone based stripper or a plasma-based O2 photoresist barrel etcher. The covert patterns now exist into the silicon as etched marks.

To add overt patterns, the wafers are cleaned and dehydrated, an adhesion promoter (HMDS) is applied, photoresist is spun and soft baked, the existing covert patterns are aligned on the wafer to the overt patterns on the mask, the overt patterns are exposed using a stepper or a contact printer (Suss Microtech MA6 or equiv), the photoresist is developed and finally hard baked. Using photoresist as an etch mask, the silicon is etched 1 to 10 microns deep using for example an inductively couple plasma deep reactive ion etching system (STS ICP Multiplex or equiv) using SF6 and O2 for the etch cycle and C4F8 for the passivation cycle to etch vertical side walls. The photoresist is stripped using an n-methyl-2-pyrrolidinone based stripper or a plasma-based O2 photoresist barrel etcher. The overt and covert patterns are now etched into the silicon.

Alternatively, instead of a Si wafer, a Ti disk with the same form factor and surface roughness may be used. All the processing would be identical except the Si etching process to form the overt and covert features would be replaced by Ti etching process.

The wafers are mounted on dicing tape and then diced all way through on a high speed dicing saw using a diamond-impregnated dicing blade at 20,000 rpm. The wafer is cleaned in an ultrasonic or Megasonic cleaning bath or with a high pressure deionized water spray. Alternatively, the wafer may be diced using a high powered laser to ablate away the kerf in between the individual stamps.

Priority provisional application Ser. No. 60/637,063 filed Dec. 20, 2004 to Cruchon-Dupeyrat et al is hereby incorporated by reference in its entirety and included the following "ADDITIONAL PREFERRED EMBODIMENTS":

Embodiment 1

A method of preparing a template or stamp for imprinting at least one pharmaceutical composition using electron-beam direct-write nanolithography, comprising:
(a) coating a substrate with a resist;
(b) directing a focused electron-beam onto the resist-coated substrate to form a latent image;
(c) developing the resist to form a resist pattern;
(d) etching the substrate and/or depositing material onto the surface;
(e) removing the resist to form a patterned substrate comprising surface topography with micron-scale or nanometer-scale lateral dimensions.

Embodiment 2

A template or stamp produced by the method of Embodiment 1.

Embodiment 3

A stamping apparatus comprising a template or stamp according to Embodiment 2.

Embodiment 4

A pharmaceutical composition comprising at least one identification region having a micron-scale or nanometer-scale pattern formed thereon by a template or stamp according to Embodiment 2.

Embodiment 5

A template or stamp for imprinting at least one pharmaceutical composition, produced by a method comprising:
(a) forming a micron-scale or nanometer-scale pattern on a substrate by an optical lithography technique.

Embodiment 6

A template or stamp according to Embodiment 5, wherein the optical lithography technique comprises:
(a) forming a pattern on a substrate with a resist;
(b) selectively etching exposed portions of the substrate to produce a covert pattern;
(c) removing the resist.

Embodiment 7

A template or stamp according to Embodiment 6, wherein the optical lithography technique comprises:
(a) forming a pattern on a substrate with a resist;
(b) selectively etching exposed portions of the substrate to produce an overt pattern;
(c) removing the resist.

Embodiment 8

A template or stamp according to Embodiment 5, wherein the optical lithography technique comprises immersion lithography.

Embodiment 9

A template or stamp according to Embodiment 5, wherein the optical lithography technique comprises deep ultraviolet lithography.

Embodiment 10

A template or stamp according to Embodiment 5, wherein the optical lithography technique comprises vacuum ultraviolet lithography.

Embodiment 11

A template or stamp according to Embodiment 5, wherein the method further comprises one or more steps including wet or dry etching.

Embodiment 12

A template or stamp according to Embodiment 5, wherein the method further comprises one or more steps including removal of a resist.

Embodiment 13

A template or stamp according to Embodiment 5, wherein the method further comprises one or more steps including doping of the substrate.

Embodiment 14

A template or stamp according to Embodiment 5, wherein the method further comprises one or more steps including deposition of a layer.

Embodiment 15

A template or stamp according to Embodiment 5, wherein the method further comprises one or more steps including electroplating.

Embodiment 16

A template or stamp according to Embodiment 5, wherein the method further comprises one or more steps including electroless plating.

Embodiment 17

A template or stamp according to Embodiment 5, wherein the method further comprises one or more steps including a planarization step selected from the group consisting of polishing, chemical-mechanical polishing, and overcoating.

Priority provisional application Ser. No. 60/637,063 filed Dec. 20, 2004 to Cruchon-Dupeyrat et al is hereby incorporated by reference in its entirety and also included the following which are reproduced:

1. A method of making a pharmaceutical composition having at least one identification region and at least one identification feature comprising: (i) providing a stamp which has a surface to form at least one identification region having at least one identification feature; (ii) providing a pharmaceutical composition having a surface; and (iii) contacting the stamp and the pharmaceutical composition under conditions so that the pharmaceutical composition comprises a surface having the at least one identification region having at least one identification feature.

2. The method according to 1, wherein the contacting is carried out at a temperature of about 25° C. to about 400° C.

3. The method according to 1, wherein the contacting is carried out at a pressure of about 0.01 MPa to about 1,000 MPa.

4. The method according to 1, wherein the contacting is carried out for a time of about 0.1 seconds to about 50 seconds.

5. The method according to 1, wherein the contacting is carried out for a time of about 0.1 seconds to about 50 seconds, at a pressure of about 0.01 MPa to about 1,000 MPa, and at a temperature of about 25° C. to about 400° C.

6. The method according to 1, wherein the identification feature has a lateral dimension of about 100 microns or less.

7. The method according to 1, wherein the identification feature has a lateral dimension of about one micron or less.

8. The method according to 1, wherein the identification feature has a height dimension of about one micron or less.

9. The method according to 1, wherein the identification feature has a height dimension of about 250 nm or less.

10. The method according to 1, wherein the pharmaceutical composition comprises a plurality of identification features which are separated from each other by an average distance of about 100 microns or less.

11. The method according to 1, wherein the identification region is about 10,000 square microns or less.

12. The method according to 1, wherein the identification feature comprises an indentation into the surface.

13. The method according to 1, wherein the identification feature comprises a protrusion out from the surface.

14. The method according to 1, wherein identification region comprises a bar code.

15. The method according to 1, wherein identification region comprises a hologram.

16. A method of making a composition having at least one identification region and at least one identification feature without etching after formation of identification feature consisting essentially of: (i) providing a stamp which has a surface to form at least one identification region having at least one identification feature; (ii) providing a composition having a surface; and (iii) contacting the stamp and the composition under conditions so that the composition comprises a surface having the at least one identification region having at least one identification feature.

17. The method according to 16, wherein the contacting is carried out at a temperature of about 25° C. to about 400° C.

18. The method according to 16, wherein the contacting is carried out at a pressure of about 0.01 MPa to about 1,000 MPa.

19. The method according to 16, wherein the contacting is carried out for a time of about 0.1 seconds to about 50 seconds.

20. The method according to 16, wherein the contacting is carried out for a time of about 0.1 seconds to about 50 seconds, at a pressure of about 0.01 MPa to about 1,000 MPa, and at a temperature of about 25° C. to about 400° C.

21. The method according to 16, wherein the identification feature has a lateral dimension of about 500 microns or less.

22. The method according to 16, wherein the identification feature has a lateral dimension of about one micron or less.

23. The method according to 16, wherein the identification feature has a height dimension of about one micron or less.

24. The method according to 16, wherein the identification feature has a height dimension of about 250 nm or less.

25. The method according to 16, wherein the pharmaceutical composition comprises a plurality of identification features which are separated from each other by an average distance of about 100 microns or less.

26. The method according to 16, wherein the identification region is about 10,000 square microns or less.

27. The method according to 16, wherein the identification feature comprises an indentation into the surface.

28. The method according to 16, wherein the identification feature comprises a protrusion out from the surface.

29. The method according to 16, wherein identification region comprises a bar code.

30. The method according to 16, wherein identification region comprises identification features which form a hologram.

What is claimed is:

1. A method comprising:
fabricating stamps configured for stamping a pharmaceutical composition with a plurality of identification features at a desired resolution and throughput,
wherein the stamps comprise a surface having at least two identification regions, the at least two identification regions comprising the same pattern of identification features, the identification features having at least one lateral dimension of 10 microns or less, wherein the size of the stamp is one square mm or less, and wherein the identification regions each have an area of about 10,000 square microns or less, and
wherein the fabricating method provides at least 20 stamps per run.

2. The method according to claim 1, wherein the fabricating method provides at least 200 stamps per run.

3. The method according to claim 1, wherein the fabricating method provides at least 900 stamps per run.

4. The method according to claim 1, wherein the identification features have at least one lateral dimension of one micron or less.

5. The method according to claim 1, wherein the identification features have at least one lateral dimension of 500 nm or less.

6. The method according to claim 1, wherein the identification features have at least one lateral dimension of 100 nm or less.

7. The method of claim 1, wherein the at least two identification regions each comprise a barcode having lines with line widths one micron or less.

8. The method of claim 1, wherein the sizes of the stamps are one mm square or less.

9. The method of claim 1, wherein the sizes of the stamps are 0.8 mm square or less.

10. The method of claim 1, wherein the sizes of the stamps are 0.4 mm square or less.

11. The method of claim 1, wherein the sizes of the stamps are 0.2 mm square or less.

12. The method of claim 1, wherein the at least two identification regions each comprise a barcode having lines with line widths one micron or less.

13. The method of claim 1, wherein the at least two identification regions each have an area of about 1,000 micron squared or less.

14. The method of claim 1, wherein the at least two identification regions each have an area of about 400 micron squared or less.

15. The method of claim 1, wherein the at least two identification regions each comprise a barcode.

16. The method of claim 1, wherein the at least two identification regions each comprise a hologram.

17. The method of claim 1, wherein the fabricating method comprises forming a latent image by electron beam lithography, optical lithography, or deep ultraviolet lithography.

18. The method of claim 1, further comprising depositing a conformal anti-fouling layer on the stamps.

19. The method of claim 1, wherein the identification features are positive features rising out of the surface, such features having a triangular or trapezoidal shape.

20. The method of claim 1, wherein the stamps comprise a material selected from the group consisting of silicon, silicon oxide, quartz, and nickel.

* * * * *